(12) United States Patent
Thompson et al.

(10) Patent No.: US 12,285,773 B2
(45) Date of Patent: Apr. 29, 2025

(54) UNMANNED AERIAL VEHICLE FOR PAINTING STRUCTURES

(71) Applicant: Graco Minnesota Inc., Minneapolis, MN (US)

(72) Inventors: David J. Thompson, Oak Grove, MN (US); Dale D. Johnson, Shoreview, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 22 days.

(21) Appl. No.: 17/946,507

(22) Filed: Sep. 16, 2022

(65) Prior Publication Data

US 2023/0019134 A1 Jan. 19, 2023

Related U.S. Application Data

(63) Continuation of application No. 16/478,379, filed as application No. PCT/US2018/014026 on Jan. 17, 2018, now Pat. No. 11,498,090.

(Continued)

(51) Int. Cl.
*B05B 12/12* (2006.01)
*B05B 13/00* (2006.01)
(Continued)

(52) U.S. Cl.
CPC .......... *B05B 12/124* (2013.01); *B05B 13/005* (2013.01); *B05B 13/041* (2013.01);
(Continued)

(58) Field of Classification Search
CPC .......... B05B 1/04; B05B 15/60; B05B 15/65; B05B 15/652; B05B 15/68; B05B 15/50;
(Continued)

(56) References Cited

U.S. PATENT DOCUMENTS 1,001,352 A 8/1911 Chadwick
2,172,193 A * 9/1939 Downs .................. B05B 7/0475
239/416.4

(Continued)

FOREIGN PATENT DOCUMENTS

CN 104512551 A 4/2015
CN 105882973 A 8/2016
(Continued)

OTHER PUBLICATIONS

First Communication Pursuant to Article 94(3) EPC for EP Application No. 18742288.6, Dated Feb. 7, 2023, pp. 5.
(Continued)

*Primary Examiner* — Joshua J Michener
*Assistant Examiner* — Michael B. Kreiner
(74) *Attorney, Agent, or Firm* — Kinney & Lange, P.A.

(57) ABSTRACT

An unmanned aerial vehicle (UAV) includes a sprayer configured to generate a pressurized fluid flow and a nozzle configured to receive the pressurized fluid from the sprayer and to generate a spray fan to apply the fluid to a surface. The UAV includes sensors and a control unit to control both flight of the UAV and spraying by the sprayer. The fluid can be stored onboard the UAV in a reservoir or can be remotely stored and pumped to the UAV. The UAV control unit can be preloaded with a spray plan and a flight plan, or the UAV can be controlled by a user.

17 Claims, 17 Drawing Sheets

Related U.S. Application Data

(60) Provisional application No. 62/447,426, filed on Jan. 17, 2017.

(51) Int. Cl.
  *B05B 13/04* (2006.01)
  *B64D 1/18* (2006.01)
  *B64U 10/13* (2023.01)
  *B64U 30/20* (2023.01)
  *B64U 101/28* (2023.01)

(52) U.S. Cl.
  CPC ............... *B64D 1/18* (2013.01); *B64U 10/13* (2023.01); *B64U 30/20* (2023.01); *B64U 2101/28* (2023.01); *B64U 2201/10* (2023.01); *B64U 2201/104* (2023.01); *B64U 2201/20* (2023.01)

(58) Field of Classification Search
  CPC ..... B05B 15/52; B05B 15/525; B05B 15/531; B05B 15/534; B05B 13/005; B64D 1/18; B64C 39/02; B64C 2201/12
  See application file for complete search history.

(56) References Cited

U.S. PATENT DOCUMENTS

| | | | |
|---|---|---|---|
| 3,155,346 A * | 11/1964 | Charlton | B64C 15/14 244/90 R |
| 3,452,745 A * | 7/1969 | Spitz | B05B 11/1015 601/161 |
| 3,915,389 A * | 10/1975 | Updegrave | B05B 15/68 285/190 |
| 4,795,111 A | 1/1989 | Moller | |
| 5,968,271 A * | 10/1999 | Maxwell | B05B 15/68 118/712 |
| 6,264,115 B1 * | 7/2001 | Liska | B05B 15/534 239/71 |
| 6,626,375 B1 | 9/2003 | Ireland | |
| 6,655,606 B2 * | 12/2003 | Earl | B05B 9/01 239/581.1 |
| 6,745,955 B2 * | 6/2004 | Kronz | B05B 13/0636 239/243 |
| 6,932,280 B2 * | 8/2005 | Crouch | B05C 5/02 118/313 |
| 7,267,300 B2 * | 9/2007 | Heath | B64C 29/0025 244/12.3 |
| 7,717,356 B2 | 5/2010 | Petersen | |
| 7,878,096 B2 * | 2/2011 | Banks | B05B 1/14 408/56 |
| 8,267,332 B1 * | 9/2012 | Jones | B05B 9/0861 239/526 |
| 8,967,029 B1 | 3/2015 | Calvert | |
| 9,192,952 B2 * | 11/2015 | Becker | B05B 9/0855 |
| 9,382,003 B2 | 7/2016 | Burema et al. | |
| 9,610,595 B2 * | 4/2017 | Peterson | B05B 3/085 |
| 9,611,038 B2 | 4/2017 | Dahlstrom | |
| 9,657,819 B2 * | 5/2017 | Sebert | B24B 55/02 |
| 9,776,200 B2 | 10/2017 | Busby et al. | |
| 10,011,352 B1 | 7/2018 | Dahlstrom | |
| 10,399,676 B2 | 9/2019 | Dahlstrom | |
| 10,478,841 B2 * | 11/2019 | Harris | B05B 9/0426 |
| 10,526,083 B2 | 1/2020 | Shaw | |
| 11,065,636 B2 * | 7/2021 | Fideler | B05B 14/00 |
| 11,173,511 B2 * | 11/2021 | Thompson | B05B 13/041 |
| 11,235,890 B1 * | 2/2022 | Dahlstrom | B64D 1/18 |
| 11,919,021 B2 * | 3/2024 | Busby | B05B 9/007 |
| 2003/0085319 A1 | 5/2003 | Wagner et al. | |
| 2013/0134254 A1 | 5/2013 | Moore | |
| 2015/0274294 A1 | 10/2015 | Dahlstrom | |
| 2015/0344136 A1 | 12/2015 | Dahlstrom | |
| 2016/0082460 A1 * | 3/2016 | McMaster | B05B 9/0403 239/722 |
| 2016/0207625 A1 | 7/2016 | Judas et al. | |
| 2016/0318607 A1 | 11/2016 | Desai et al. | |
| 2017/0259920 A1 | 9/2017 | Lai et al. | |
| 2018/0291860 A1 | 10/2018 | Gopal et al. | |
| 2019/0002100 A1 | 1/2019 | Zhao | |
| 2019/0291860 A1 | 9/2019 | Morgan | |
| 2020/0122178 A1 | 4/2020 | Logan | |

FOREIGN PATENT DOCUMENTS

| | | | |
|---|---|---|---|
| CN | 106114836 A | 11/2016 | |
| EP | 0153840 A1 | 9/1985 | |
| JP | 62079865 A | 4/1987 | |
| JP | H10524584 A | 2/1993 | |
| JP | 09271698 A | 10/1997 | |
| JP | 2012126216 A | 7/2012 | |
| WO | WO-2012059868 A1 * | 5/2012 | .......... B05B 12/122 |
| WO | 2015150529 A1 | 10/2015 | |
| WO | 2016192024 A1 | 12/2016 | |
| WO | 2017145183 A1 | 8/2017 | |

OTHER PUBLICATIONS

Extended European Search Report for EP Application No. 18742288.6, Dated Nov. 4, 2020.
First Chinese Office Action for CN Application No. 2018800072947, Dated Mar. 3, 2022, pp. 12.
International Preliminary Report on Patentability for PCT Application No. PCT/US2018/014026, Dated Aug. 1, 2019, pp. 36.
International Search Report and Written Opinion for PCT Application No. PCT/US2018/014026, Dated May 9, 2018, pp. 40.
Second Chinese Office Action for CN Application No. 201880007294.7, Dated Aug. 18, 2022, pp. 4.

* cited by examiner

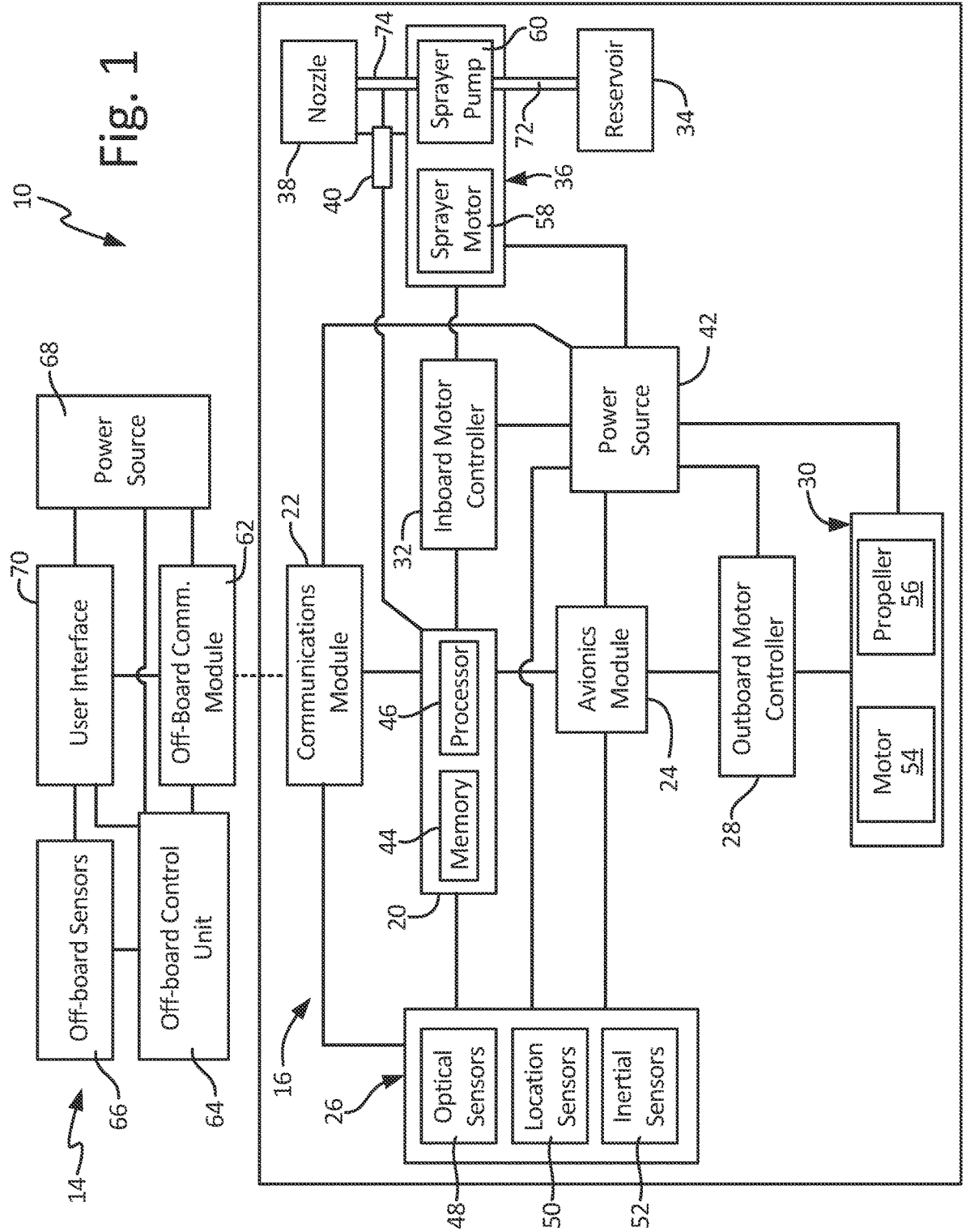

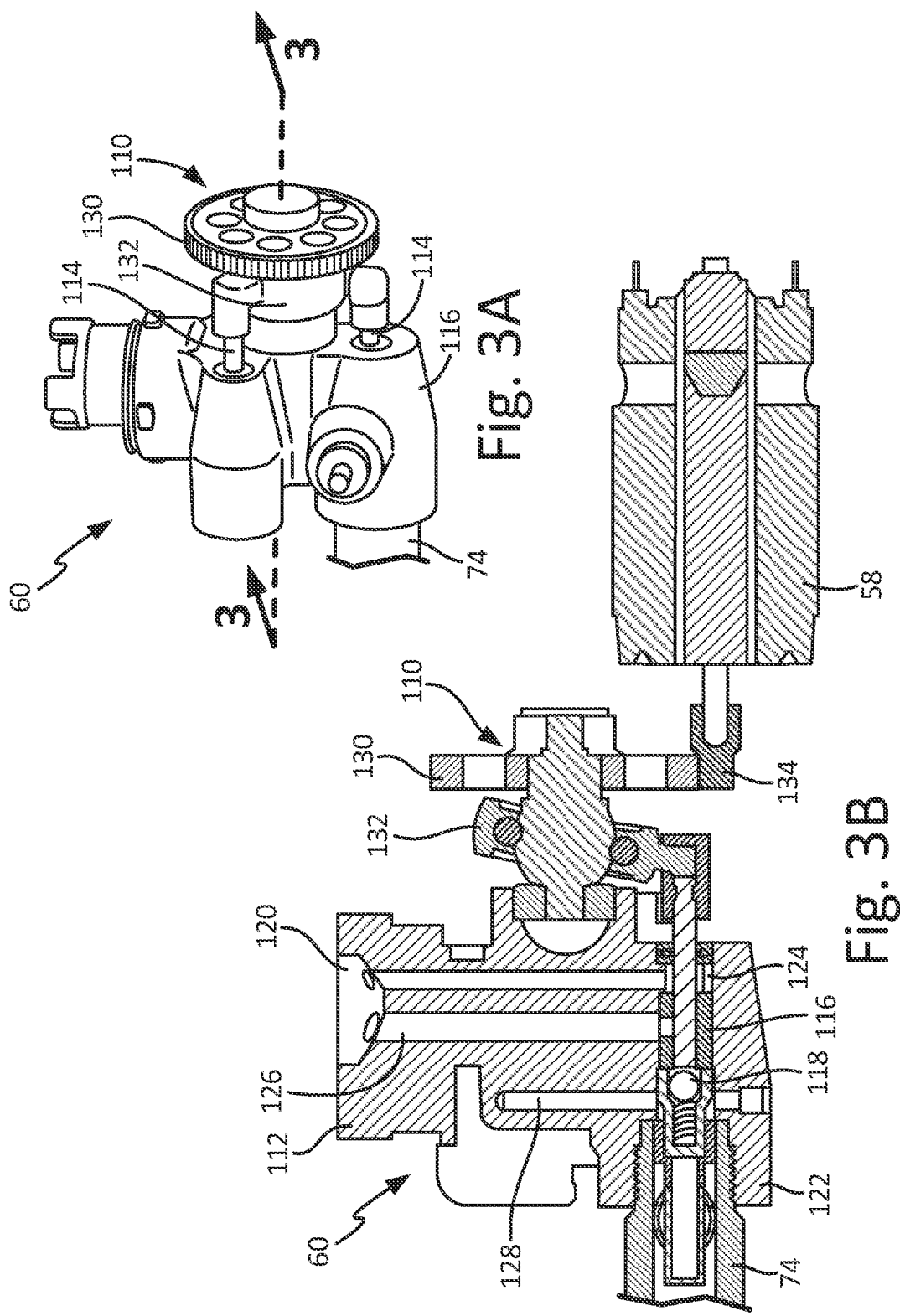

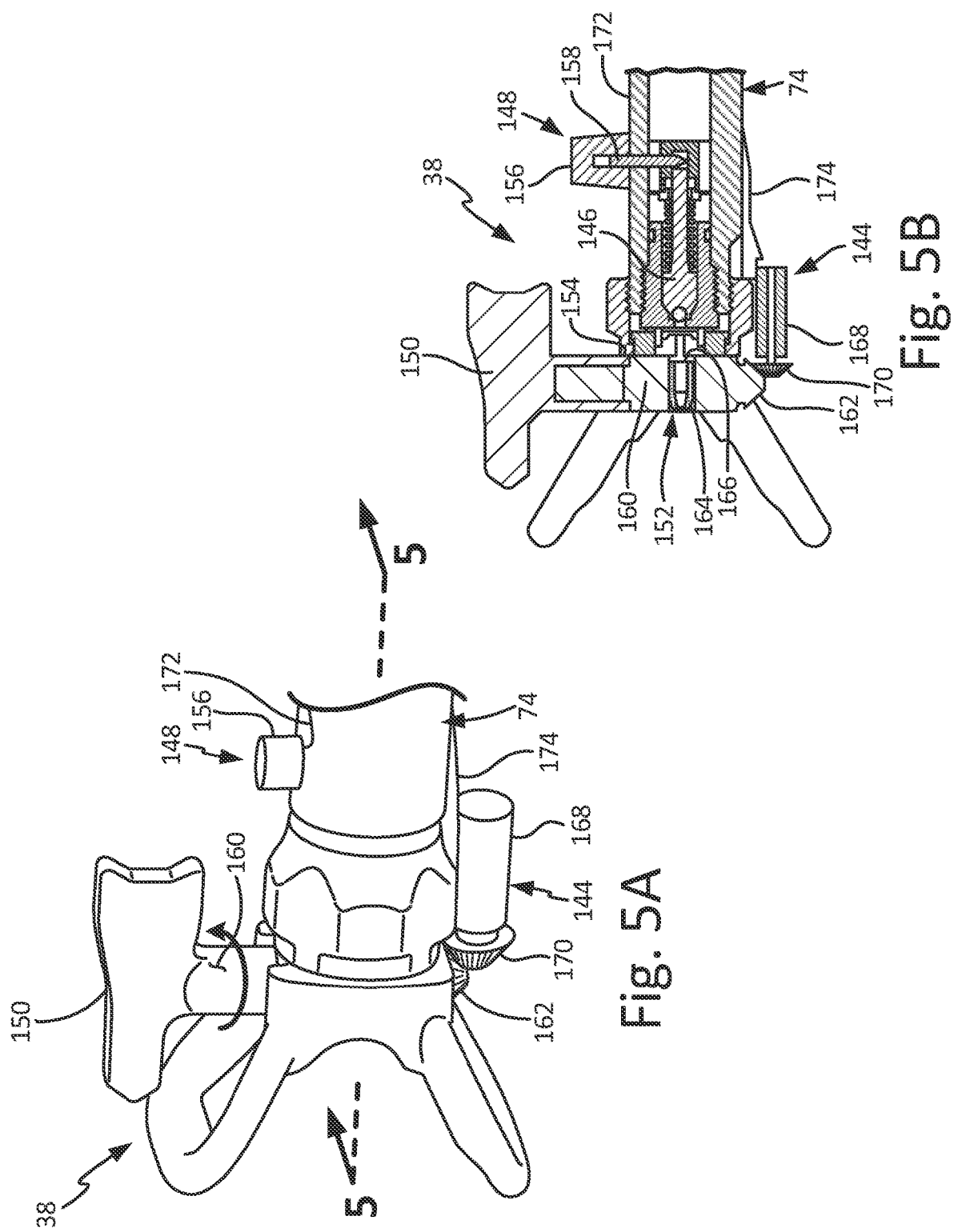

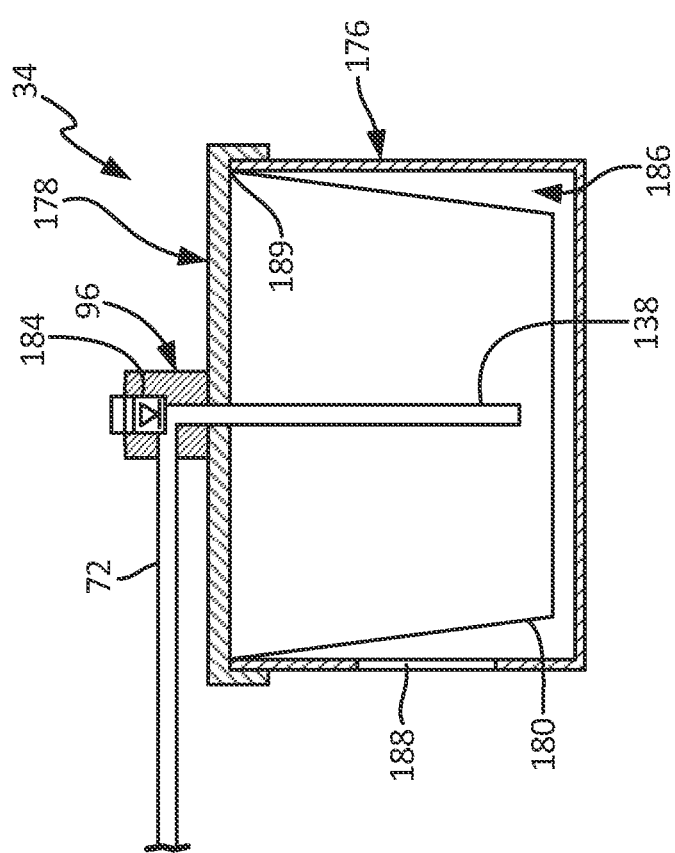

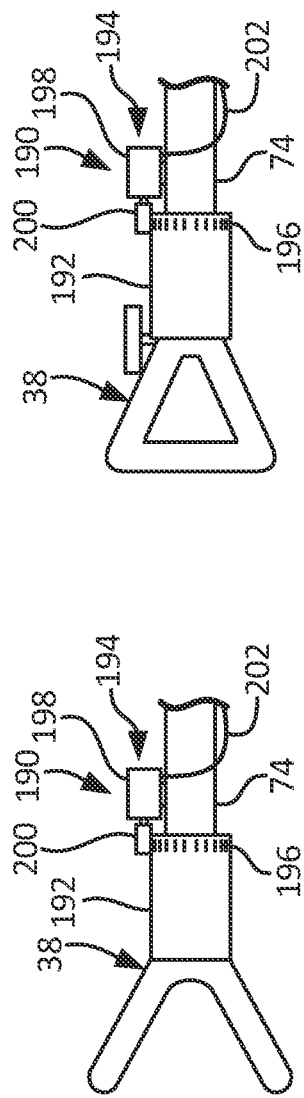
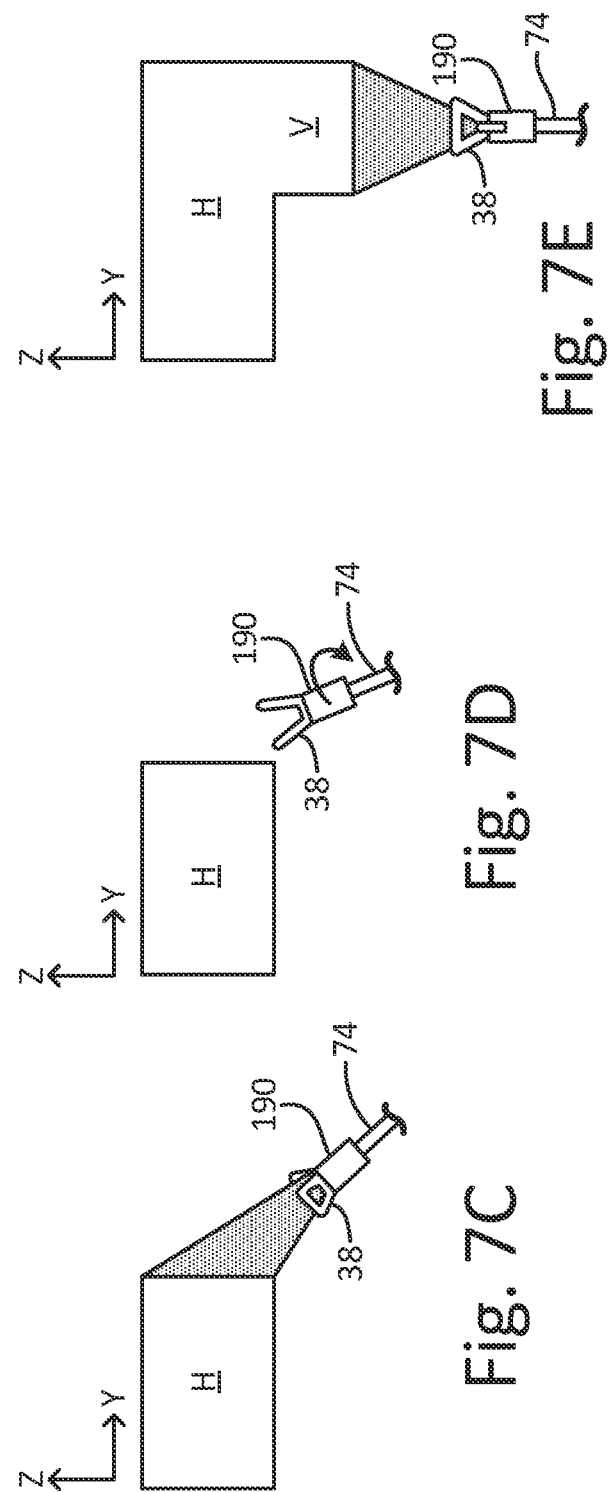
Fig. 7A  Fig. 7B  Fig. 7C  Fig. 7D  Fig. 7E

UNMANNED AERIAL VEHICLE FOR PAINTING STRUCTURES

CROSS-REFERENCE TO RELATED APPLICATION(S)

This application is a continuation of U.S. application Ser. No. 16/478,379 filed Jul. 16, 2019 for "UNMANNED AERIAL VEHICLE FOR PAINTING STRUCTURES," which in turn claims the benefit of PCT International Application No. PCT/US2018/014026 filed Jan. 17, 2018 for "UNMANNED AERIAL VEHICLE FOR PAINTING STRUCTURES," which in turn claims the benefit of U.S. Provisional Application No. 62/447,426 filed Jan. 17, 2017, and entitled "UNMANNED AERIAL VEHICLE FOR PAINTING STRUCTURES," the disclosure of which is hereby incorporated in its entirety.

BACKGROUND

This disclosure relates generally to mobile fluid spraying systems. More specifically, this disclosure related to unmanned aerial vehicle fluid spraying systems.

Fluid spray systems produce an atomized fluid spray fan and apply the spray fan to a surface. The spray fan is typically in a horizontal orientation or a vertical orientation. In the horizontal orientation the fan is swept across the surface in vertical passes. In the vertical orientation the fan is swept across the surface in horizontal passes. As such, the spray fan is oriented orthogonal to the sweep direction. Typically, a user operates a spray gun to apply the fluid to the surface.

Unmanned aerial vehicles (UAVs), also known as drones, can operate autonomously and can be controlled by a user. UAVs can be pre-programmed to follow designated flight paths. UAVs can also be controlled remotely, such as by a user via a controller. UAVs provide access to areas that are dangerous, inaccessible, and inefficient for the user to access, such as building exteriors and interiors, walls, bridges, utility structures, vehicles, and ships, among others.

SUMMARY

According to one aspect of the disclosure, an unmanned aerial vehicle (UAV) for spraying a fluid on a surface of a structure includes a UAV body supporting at least one lift rotor configured to operationally drive the UAV body; a fluid source supported by the UAV body, the fluid source including a reservoir disposed on the UAV body; a nozzle supported by the UAV body, the nozzle configured to release the fluid as a spray on the surface; and a control unit supported by the UAV body, the control unit configured to control a flight parameter of the UAV and to control a spray generation by the fluid dispensing system. A center of the reservoir is aligned on at least one of a UAV vertical axis, a UAV lateral axis, and a UAV longitudinal axis.

According to another aspect of the disclosure, a UAV for spraying a fluid on a surface of a structure includes a UAV body supporting at least one lift rotor configured to operationally drive the UAV body; a reservoir supported by the UAV body; a nozzle disposed downstream of and fluidly connected to the reservoir, the nozzle configured to release the fluid as a spray on the surface; and a control unit supported by the UAV body, the control unit configured to control a flight parameter of the UAV and to control spraying of the fluid by the fluid dispensing system. The reservoir includes a body defining a chamber; a lid attached to the body; and a flexible, collapsible liner disposed within the chamber, the liner configured to store the fluid.

According to yet another aspect of the disclosure, a UAV for spraying a fluid on a surface of a structure includes a UAV body supporting at least one lift rotor configured to operationally drive the UAV body; a fluid source supported by the UAV body; a nozzle supported by the UAV body, the nozzle configured to receive fluid from the fluid source and release the fluid as a spray on the surface; and a control unit supported by the UAV body, the control unit configured to control a flight parameter of the UAV and to control spraying of the fluid by the fluid dispensing system. The nozzle is aligned on a longitudinal axis of the UAV body that extends through a center of mass of the UAV body.

According to yet another aspect of the disclosure, a UAV for spraying a fluid on a surface of a structure includes a UAV body; a plurality of rotors supported by the UAV body and configured to operationally drive the UAV body; a fluid source supported by the UAV body; a nozzle supported by the UAV body, the nozzle configured to release the fluid as a spray on the surface; and a control unit supported by the UAV body, the control unit configured to control a flight parameter of the UAV and to control spraying of the fluid by the nozzle. The plurality of rotors include at least one lift rotor; and at least one side rotor extending from a side of the UAV body.

According to yet another aspect of the disclosure, a UAV for spraying a fluid on a surface of a structure includes a UAV body supporting at least one lift rotor configured to operationally drive the UAV body; a fluid source supported by the UAV body; a nozzle supported by the UAV body, the nozzle configured to release the fluid as a spray on the surface; a first sensor supported by the UAV body and configured to sense a first distance, the first distance being a distance between the surface and the first location sensor; a second sensor supported by the UAV body and configured to sense a second distance, the second distance being a distance between the surface and the second sensor; and a control unit supported by the UAV body, the control unit configured to control a flight parameter of the UAV and configured to control spraying of the fluid by the nozzle based on at least one of the first distance and the second distance.

According to yet another aspect of the disclosure, a UAV for spraying a fluid on a surface of a structure includes a UAV body supporting at least one lift rotor configured to operationally drive the UAV body; a fluid source supported by the UAV body; a nozzle supported by the UAV body, the nozzle configured to release the fluid as a spray on the surface; an inertial sensor supported by the UAV body, the inertial sensors configured to monitor a sensed acceleration; and a control unit supported by the UAV body, the control unit configured to control a flight parameter of the UAV and configured to control a spray generation by the nozzle based on the sensed acceleration from the inertial sensor.

According to yet another aspect of the disclosure, a UAV for spraying a fluid on a surface of a structure includes a UAV body supporting at least one lift rotor configured to operationally drive the UAV body; a fluid source supported by the UAV body; a spray tube fluidly connected to and extending from the fluid source; a nozzle disposed downstream of and fluidly connected to the spray tube, the nozzle configured to generate a spray; a fan rotating assembly extending between and connecting the spray tube and the nozzle; and a control unit supported by the UAV body, the control unit configured to control a flight parameter of the UAV and to control a spray generation by the nozzle. The fan rotating assembly is configured to rotate the nozzle relative to the UAV body and between a vertical spray fan orientation and a horizontal spray fan orientation.

According to yet another aspect of the disclosure, a UAV for spraying a fluid on a surface of a structure includes a UAV body; an arm extending from the UAV body; at least one lift rotor supported by the arm and configured to generate vertical thrust; a propeller cover mounted on the arm and enclosing the at least one lift rotor; a fluid source supported by the UAV body; a nozzle supported by the UAV body, the nozzle configured to release the fluid as a spray on the surface; and a control unit supported by the UAV body, the control unit configured to control a flight parameter of the UAV and to control a spray generation by the nozzle.

According to yet another aspect of the disclosure, a UAV for spraying a fluid on a surface of a structure includes a UAV body supporting at least one lift rotor configured to operationally drive the UAV body; a fluid source supported by the UAV body; a nozzle disposed downstream of and fluidly connected to the sprayer, the nozzle mounted on a spray tube extending between the fluid source and the nozzle; an overspray mitigation device mounted on the spray tube proximate the nozzle; and a control unit supported by the UAV body, the control unit configured to control a flight parameter of the UAV and to control a spray generation by the nozzle. The overspray mitigation device is configured to blow overspray towards the surface being sprayed.

According to yet another aspect of the disclosure, a UAV for spraying a fluid on a surface of a structure includes a UAV body supporting at least one lift rotor configured to operationally drive the UAV body; a fluid source supported by the UAV body; a spray tube supported by the UAV body and fluidly connected to the fluid source, the spray tube including a first branch and a second branch; a first nozzle mounted on the first branch of the spray tube and fluidly connected to the fluid source; a second nozzle mounted on the second branch of the spray tube and fluidly connected to the fluid source; and a control unit supported by the UAV body, the control unit configured to control a flight parameter of the UAV and to control a spray generation by the nozzle.

According to yet another aspect of the disclosure, n aerial spray system includes a UAV and an off-board supply system. The UAV includes a UAV body; an arm extending from the UAV body; at least one lift rotor supported by the arm and configured to generate vertical thrust; an upper fluid port extending into a top of the UAV body; a sprayer pump fluidly connected to the first fluid port and the second fluid port and configured to generate a pressurized fluid flow; a nozzle disposed downstream of and fluidly connected to the sprayer pump, the nozzle configured to apply the pressurized fluid flow to a surface; and a control unit supported by the UAV body, the control unit configured to control a flight parameter of the UAV and to control a spray generation by the nozzle. The off-board supply system includes a reservoir configured to store the fluid; an off-board pump mounted on the reservoir and configured to drive fluid downstream from the reservoir and to the sprayer pump; a tether extending from the off-board pump and connected to the first fluid port of the UAV, the tether configured to provide the fluid to the UAV; and a controller connected to the off-board supply system and configured to control the off-board pump. The off-board fluid supply is elevated above the UAV during flight.

According to yet another aspect of the disclosure, an aerial spray system includes a UAV and an off-board supply system. The UAV includes a UAV body; an arm extending from the UAV body; at least one lift rotor supported by the arm and configured to generate vertical thrust; an upper fluid port extending into a top of the UAV body; a lower fluid port extending into a bottom of the UAV body; a sprayer pump fluidly connected to the upper fluid port and the lower fluid port and configured to generate a pressurized fluid flow; a nozzle disposed downstream of and fluidly connected to the sprayer pump, the nozzle configured to apply the pressurized fluid flow to a surface; and a control unit supported by the UAV body, the control unit configured to control a flight parameter of the UAV and to control a spray generation by the nozzle. The off-board supply system includes a ground vehicle; a reservoir mounted on the ground vehicle, the reservoir configured to store the fluid; an off-board pump mounted on the reservoir and configured to drive fluid downstream from the reservoir and to the sprayer pump; a tether extending from the off-board pump and connected to the lower fluid port of the UAV, the tether configured to provide the fluid to the UAV; and a controller connected to the off-board supply system and configured to control the off-board pump and the ground vehicle.

According to yet another aspect of the disclosure, an aerial spray system includes a UAV and an off-board supply system. The UAV includes a UAV body including at least one lift rotor configured to generate vertical thrust; a fluid port extending into the UAV body; a sprayer pump fluidly connected to the fluid port and configured to generate a pressurized fluid flow; and a nozzle disposed downstream of and fluidly connected to the sprayer pump, the nozzle configured to apply the pressurized fluid flow to a surface. The off-board supply system includes an off-board pump configured to drive fluid downstream from a reservoir and to the sprayer pump; and a fluid supply hose extending from the off-board pump and connected to the fluid port of the UAV, the fluid supply hose configured to provide the fluid to the UAV. The sprayer pump comprises a high-pressure pump configured to generate a first fluid pressure sufficient to atomize the fluid when sprayed from the nozzle, and the off-board pump comprises a low-pressure pump configured to generate a second fluid pressure sufficient to push the fluid through the fluid supply hose to the UAV, the first fluid pressure greater than the second fluid pressure.

According to yet another aspect of the disclosure, an autonomous spray system includes a mobile vehicle having a body, at least one motive component connected to the body, the at least one motive component configured to cause movement of the mobile vehicle, and a plurality of sensors supported by the body, the plurality of sensors configured to generate information regarding the mobile vehicle; a sprayer supported by the body and fluidly connected to a fluid supply by a supply tube, the sprayer configured to draw the fluid from the fluid supply through the supply tube; a nozzle fluidly connected to the sprayer and configured to generate an atomized fluid spray; and a control unit including a memory and a processor, wherein the memory is configured to store software that, when executed by the processor, controls movement of the mobile vehicle and spraying of fluid based on the information generated by the plurality of sensors.

BRIEF DESCRIPTION OF THE DRAWINGS

FIG. 1 is a schematic block diagram of an unmanned aerial vehicle spraying system.

FIG. 3A is an isometric view of a pump.

FIG. 3B is a cross-sectional view of the pump of FIG. 3A taken along line 3-3 in FIG. 3A.

FIG. 5A is an isometric view of a nozzle, a spray tube, and a de-clog mechanism.

FIG. 5B is a cross-sectional view of the nozzle, the spray tube, and the de-clog mechanism of FIG. 5A taken along line 5-5 in FIG. 5A.

FIG. 6 is a cross-sectional view of a fluid reservoir.

FIG. 7A is a side elevation view of a nozzle in a horizontal fan orientation.

FIG. 7B is a side elevation view of a nozzle in a vertical fan orientation.

FIG. 7C is a perspective view of a nozzle applying a spray fan while in the horizontal fan orientation shown in FIG. 7A.

FIG. 7D is a perspective view of a nozzle with the spray fan in an intermediate orientation.

FIG. 7E is a perspective view of a nozzle applying a spray fan while in the vertical fan orientation shown in FIG. 7B.

DETAILED DESCRIPTION

Figure 2A:
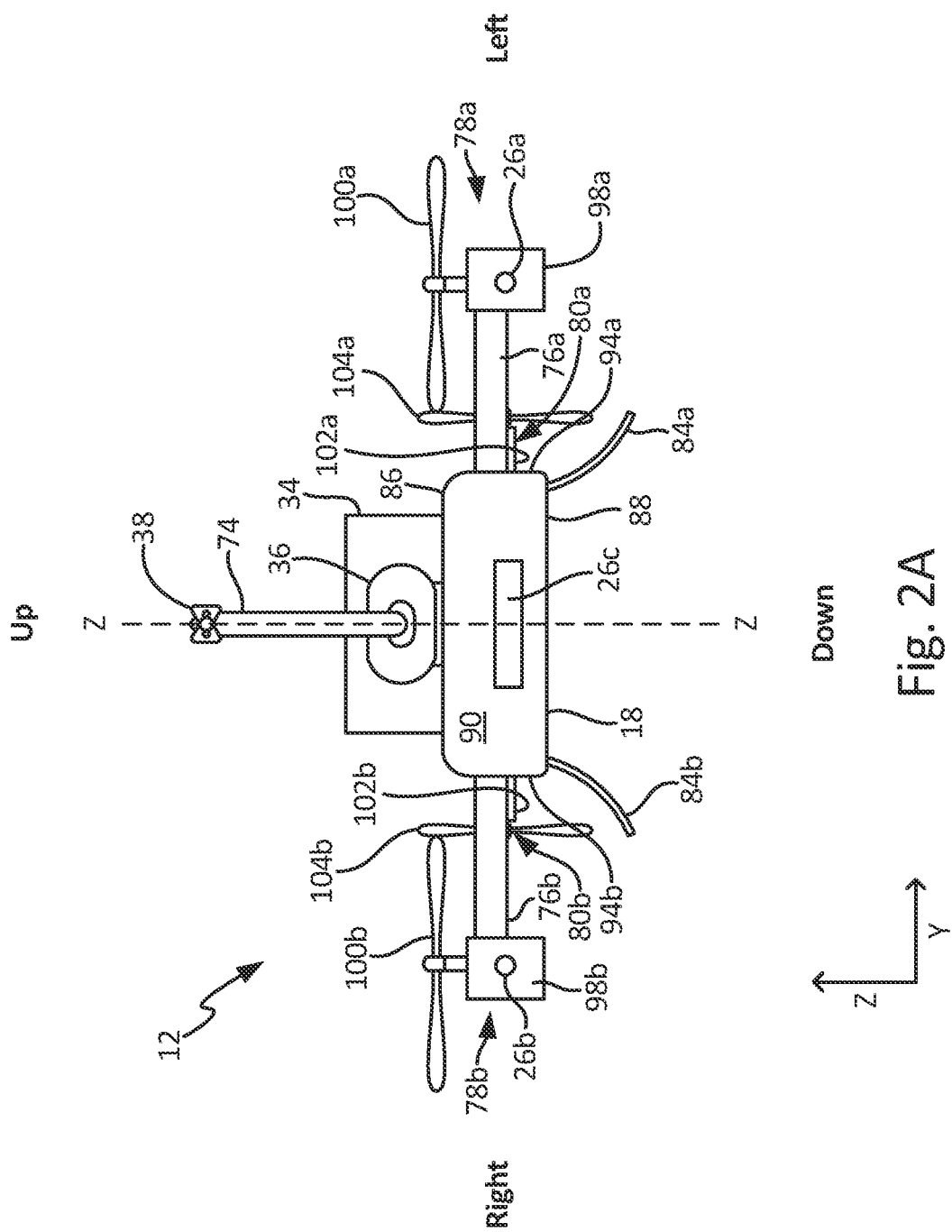
FIG. 2A is a front elevation view of an unmanned aerial vehicle.

FIG. 1 is a schematic block diagram of unmanned aerial vehicle (UAV) spray system 10. UAV spray system 10 includes UAV 12 and off-board components 14. UAV 12 is an aerial vehicle configured to apply a fluid, such as paint, varnish, water, oil, stains, finishes, coatings, and solvents, among others, onto a surface. Examples surfaces can be interior, such as walls, or exterior, such as buildings, bridges, utility towers, and vehicles, among others.

UAV 12 includes on-board components 16 and body 18. On-board components 16 include control unit 20, communications module 22, avionics module 24, sensors 26, outboard motor controller 28, rotors 30, inboard motor controller 32, reservoir 34, sprayer 36, nozzle 38, spray sensors 40, and power source 42. Control unit 20 includes memory 44 and processor 46. Sensors 26 include optical sensors 48, location sensors 50, and inertial sensors 52. Rotors 30 include outboard motors 54 and outboard propellers 56. Sprayer 36 includes sprayer motor 58 and pump 60. Off-board components 14 include off-board communications module 62, off-board control unit 64, off-board sensors 66, off-board power source 68, and user interface 70. It is understood that the connections shown between various onboard components and between various off-board components can represent any one or more of electrical connections, communications connections, physical connections, and wired and/or wireless connections.

Power source 42 is configured to provide power to on-board components 16 of UAV 12, including both electrical components and mechanical components. Power source 42 can be mounted on UAV 12 or can provide power sourced form an off-board location. In some examples, power source 42 is a battery, such as a rechargeable lithium ion battery. In other examples, power source 42 is an electrical cable connected to UAV 12 along a tether that is configured to provide power to UAV 12 from an electrical outlet or a generator.

Rotors 30 are mounted on body 18 of UAV 12. Rotors 30 generate thrust to drive UAV 12 during flight. Propellers 56 are mounted on and driven by outboard motors 54. Outboard motors 54 independently drive propellers 56, and can, in some examples, tilt propellers 56 to provide lateral thrust relative to the propeller axis. Rotors 30 can include any one or more of lift rotors configured to generate vertical thrust for flight and side rotors configured to generate horizontal or forward thrust. In some examples, the side rotors can include lateral rotors configured to generate horizontal thrust and/or or force compensation rotors configured to generate forward thrust during spraying. Outboard motors 54 communicate with and are controlled by outboard motor controller 28. Each rotor 30 is independent of other rotors 30 such that each rotor 30 can operate at a variable speed and pitch angle relative to all other rotors 30.

Reservoir 34 is mounted on body 18 and is configured to store fluid for application by UAV 12. Sprayer 36 is mounted on body 18 and fluidly connected to reservoir 34 by supply tube 72. Sprayer 36 can include a common housing to enclose the components of sprayer 36. For example, sprayer 36 can include a clamshell housing formed from polymer or metal. Pump 60 receives supply tube 72 and is configured to draw fluid out of reservoir 34 through supply tube 72. Pump 60 is connected to and driven by sprayer motor 58. Sprayer motor 58 communicates with and is controlled by inboard motor controller 32. Pump 60 can be any suitable pump for generating a sufficient spray pressure (about 500-4000 psi). For example, pump 60 can be any one of a piston pump, a diaphragm pump, and a peristaltic pump, among other options. Where pump 60 is a piston pump, pump 60 can include one piston, two pistons, three pistons, or any desired number of pistons. While sprayer 36 is described as receiving fluid from reservoir 34, it is understood that sprayer 36 can receive fluid from any desired fluid source, including both on-board and off-board fluid sources. As such, the fluid supply of UAV 12, which can include reservoir 34 and does include pump 60, is fully supported by body 18. In some examples, such as where the reservoir is disposed off-board of body 18, the fluid supply can be partially supported by body 18, such as by body 18 supporting a tether extending to body 18. In each example, however, pump 60 is disposed onboard of and is supported by body 18.

Nozzle 38 is fluidly connected to pump 60 by spray tube 74 and is mounted on spray tube 74. Spray tube 74 receives fluid from an outlet of pump 60 and provides a flowpath for the fluid to flow to nozzle 38. It is understood that spray tube 74 can be a separate tube extending from pump 60, can be an integral channel formed in a housing, or can be any other suitable fluid transfer pathway between pump 60 and nozzle 38. Nozzle 38 atomizes the fluid and ejects the fluid in a spray fan for application to a surface.

Control unit 20 communicates with avionics module 24, inboard motor controller 32, outboard motor controller 28, and communications module 22. Control unit 20 is configured to both store software and to implement functionality and/or process instructions. Control unit 20 can communicate via wired and/or wireless communications, such as serial communications (e.g., RS-232, RS-485, or other serial communications), digital communications (e.g., Ethernet), WiFi communications, cellular communications, or other wired and/or wireless communications. Memory 44 configured to store software that, when executed by processor 46, causes UAV 12 to execute instructions and apply the fluid to a surface. For example, processor 46 can be a microprocessor, a controller, a digital signal processor (DSP), an application specific integrated circuit (ASIC), a field-programmable gate array (FPGA), or other equivalent discrete or integrated logic circuitry. Control unit 20 can be configured to store information during operation. Memory, in some examples, is described as computer-readable storage media. In some examples, a computer-readable storage medium can include a non-transitory medium. The term "non-transitory" can indicate that the storage medium is not embodied in a carrier wave or a propagated signal. In some examples, the memory 44 is a temporary memory, meaning that a primary purpose of memory 44 is not long-term storage. Memory 44, in some examples, is described as volatile memory, meaning that memory 44 does not maintain stored contents when power to control unit 20 is turned off. Memory 44, in some examples, also includes one or more computer-readable storage media. Memory 44 can be configured to store larger amounts of information than volatile memory. Memory 44 can further be configured for long-term storage of information. In some examples, memory 44 includes non-volatile storage elements.

Sensors 26 are supported by body 18 and are configured to receive inputs and to provide outputs regarding UAV 12, the spray fan, and objects around UAV 12, among others. Location sensors 50, inertial sensors 52, and optical sensors 48 are supported by body 18 of UAV 12. Location sensors 50 can be any suitable sensors for determining the location of UAV 12, either spatially or relative to another object. For example, location sensors 50 can be any one or more of a GPS receiver chip, camera, proximity sensor, radar transducer, ultrasonic and/or acoustic rangefinder, laser rangefinder, magnetometer, radar, and lidar, among other options. Inertial sensors 52 can be any suitable sensor for sensing movement and/or acceleration of UAV 12. For example, inertial sensors 52 can include accelerometers and/or gyroscopes. Optical sensors 48 can be any suitable senor for providing visual information for use in object and/or surface detection and in navigation, such as a camera. Spray sensors 40 can be any suitable sensor for providing information regarding the spray generated by sprayer 36. In some examples, spray sensors 40 can include pressure sensors configured to sense the fluid pressure downstream of pump 60, such as in spray tube 74. In other examples, spray sensors 40 can further include a camera configured to monitor the spray fan.

Avionics module 24 controls flight operations of UAV 12. Avionics module 24 receives inputs from one or more of location sensors 50, inertial sensors 52, and optical sensors 48. Avionics module 24 further receives commands from control unit 20. Avionics module 24 provides commands to outboard motor controller 28 and provides information to control unit 20. Avionics module 24 can include a microprocessor, a controller, a digital signal processor (DSP), an application specific integrated circuit (ASIC), a field-programmable gate array (FPGA), or other equivalent discrete or integrated logic circuitry.

Communications module 22 communicates with off-board communications module 62 via communications link 23. Communications module 22 and off-board communications module 62 can communicate via wired and/or wireless communications, such as serial communications (e.g., RS-232, RS-485, or other serial communications), digital communications (e.g., Ethernet), WiFi communications, cellular communications, or other wired and/or wireless communications. For example, UAV 12 can be connected to a tether, and the tether can support a communications cable extending between communications module 22 and off-board communications module 62. Communications module 22 can provide information, such as a visual image from optical sensor 48 among other flight information from control unit 20, to off-board communications module 62 and thus to the user via user interface 70. The user can send commands, such as flight and spray commands, to UAV 12 from user interface 70 via communications link 23.

Off-board components 14 provide information and commands to UAV 12. Off-board power source 68 provides power to off-board components 14. In some examples, off-board power source 68 is a battery, such as a rechargeable lithium ion battery. In some examples, off-board power source 68 is a power cord providing power from an electrical outlet or a generator. It is understood that off-board power source 68 can be a single power source that provides power to all off-board components 14 or off-board power source 68 can include multiple discrete power sources that each provide power to individual off-board components 14. In some examples, off-board power source 68 provides power to power source 42 via an electrical cable. For example, the electrical cable can be attached to a tether connected to UAV 12.

Off-board components 14 can include components that provide fluid to UAV 12 from a ground-based source. In some examples, off-board components can include a ground reservoir for storing a bulk supply of fluid and an off-board pump for driving the off-board fluid supply to UAV 12. For example, UAV 12 can be attached to a tether, and a supply tube is connected to the tether and supplies the fluid to UAV 12.

User interface 70 allows the user to interact with UAV 12. User interface 70 allows the user to receive information from UAV 12, send commands to UAV 12, or both. For example, user interface 70 can include any one or more of a keyboard, touchscreen, joystick, roller ball, laptop, or any other suitable interface device. Off-board sensors 66 can include one or more of a GPS receiver chip, location sensor, camera, and a proximity sensor, for detecting proximity to UAV 12 for example. Off-board sensors 66 can provide information about the relative location and flight characteristics of UAV 12 to the user via user interface 70.

Off-board control unit 64 communicates with UAV 12 and other off-board components 14 via off-board communications module 62. Off-board control unit 64 is configured to both store software and to implement functionality and/or process instructions. Off-board control unit 64 includes a memory configured to store software that, when executed by a processor, causes UAV 12 to execute instructions and apply the fluid to a surface. For example, off-board control unit 64 can be a microprocessor, a controller, a digital signal processor (DSP), an application specific integrated circuit (ASIC), a field-programmable gate array (FPGA), or other equivalent discrete or integrated logic circuitry. Off-board control unit 64 can be configured to store information during operation. The memory of off-board control unit 64, in some examples, is described as computer-readable storage media. In some examples, a computer-readable storage medium can include a non-transitory medium. The term "non-transitory" can indicate that the storage medium is not embodied in a carrier wave or a propagated signal. In some examples, the memory of off-board control unit 64 is a temporary memory, meaning that a primary purpose of the memory is not long-term storage. The memory of off-board control unit 64, in some examples, is described as volatile memory, meaning that off-board control unit 64 does not maintain stored contents when power is turned off. Off-board control unit 64, in some examples, also includes one or more computer-readable storage media. Off-board control unit 64 can be configured to store larger amounts of information than volatile memory. Off-board control unit 64 can further be configured for long-term storage of information. In some examples, off-board control unit 64 includes non-volatile storage elements.

Some or all of off-board components 14, such as user interface 70, power source 42, off-board communications module 62, off-board control unit 64, and off-board sensors 66, can be collocated or individually located. For example, each of the components can be disposed in a common housing, such as a handheld controller, or located on a common platform, such as a vehicle, among other options. In other examples, each of the components can be remotely located and can communicate using a wired or wireless communication network.

UAV 12 can be operated autonomously or semi-autonomously. During autonomous operation, a flight plan is be loaded to control unit 20, and control unit 20 controls UAV 12 for both flight and spraying. During semi-autonomous operation, off-board control unit 64 communicates with control unit 20 to provide instructions to UAV 12. Control unit 20 executes the instructions and controls both flight and spraying. In one example, the surface to be sprayed can be defined by pre-programed gates or user-assigned gates defining spray boundaries. Control unit 20 controls spraying based on sensors 26 indicating that UAV 12 is inside of or outside of the spray boundary defined by the gates. For example, the spray-on gates define the edges of a wall, and the spray-off gates surround a feature not to be painted, such as a window. Control unit 20 allows spraying when UAV 12 is within the boundary defined by the spray-on gates and disallows spraying when UAV 12 is either outside of the boundary defined by the spray-on gates or inside of a boundary defined by spray-off gates. It is understood that, in some examples, a single gate can be both a spray-off gate and a spray-on gate. For example, the gate can act as a spray-off gate when UAV 12 is approaching the gate from within the boundary defining the surface to be sprayed, and the same gate can act as a spray-on gate when UAV 12 is approaching the gate from within the boundary defining the surface not to be sprayed. As such, control unit 20 is configured to define the gate based on the position of UAV 12.

During operation, control unit 20 controls flight of UAV 12 via avionics module 24, and avionics module 24 provides commands to outboard motor controller 28 to control flight of UAV 12. Rotors 30 generate thrust to drive flight of UAV 12. Outboard motors 54 drive the rotation of propellers 56, and propellers 56 generate thrust and propulsion for UAV 12. Control unit 20 guides UAV 12 to a desired start location, which can be confirmed by location sensors 50, optical sensors 48 and/or off-board sensors 66. In some examples, the user controls the flight of UAV 12 to the start location via user interface 70. In other examples, control unit 20 guides UAV 12 to the start location according to a preset flight/spray plan.

With UAV 12 in the desired start position control unit 20 implements a spray routine. The spray routine defines the flight path of UAV 12 during spraying and defines the start/stop interval for spraying. The spray routine can also control various spray characteristics, such as spray fan orientation, nozzle selection in examples where UAV 12 includes multiple nozzles 38, and location relative to the surface to be sprayed, among others.

Control unit 20 sends a start spray command, which can be generated by the user or based on the preset flight/spray plan, to inboard motor controller 32, and inboard motor controller 32 activates sprayer motor 58. Sprayer motor 58 drive pump 60. Pump 60 draws the fluid from reservoir 34 through supply tube 72, pressurizes the fluid, and drives the fluid under pressure to nozzle 38 through spray tube 74. Nozzle 38 generates a vertical spray fan, horizontal spray fan, or intermediate spray fan, depending on the desired spray fan. Nozzle 38 is preferably positioned to generate a spray fan orthogonal to the surface being sprayed and to the direction of travel of UAV 12. It is understood, however, that nozzle 38 can be positioned to generate any desired spray fan orientation. For example, control unit 20 positions nozzle 38 to generate a vertical spray fan, which is elongate along vertical axis Z-Z, where UAV 12 transitions laterally, along lateral axis Y-Y, relative to the surface during spraying. Control unit 20 positions nozzle 38 to generate a horizontal spray fan, which is elongate along lateral axis Y-Y, where UAV 12 transitions vertically, along vertical axis Z-Z, relative to the surface during spraying.

Control unit 20 controls spraying such that UAV 12 applies the spray fan only when UAV 12 is in a desired spray position. It is understood that the desired spray position can include a coordinate position as well as an orientation of UAV 12 relative to the surface. The quality and aesthetics of the sprayed fluid depend on UAV 12 spraying the fluid only when UAV 12 is properly positioned. In addition, ensuring that UAV 12 sprays only when properly positioned prevents UAV 12 from spraying surfaces that are not intended to be sprayed. Location sensors 50 can be positioned on UAV 12 to provide a distance of UAV 12 to the surface. For example, location sensors 50 can include three locational sensors configured to provide triangulated locational data. It is understood, however, that UAV 12 can include as many or as few location sensors 50 as desired and as required to provide accurate locational information. In some examples, control unit 20 sends the start spray command only when location sensors 50 indicate that UAV 12 is positioned to generate a spray fan orthogonal to the surface.

In some examples, control unit 20 deactivates sprayer 36 when sensors 26 indicate that UAV 12 has moved out of the desired spray position. Control unit 20 can deactivate spraying by shutting a valve in nozzle 38 or deactivating sprayer motor 58, for example. In some examples, control unit 20 can override a user input or preprogrammed flight plan commanding UAV 12 to spray when control unit 20 detects that UAV 12 shifts out of the desired spray position, thereby preventing unintended spray. In some examples, control unit 20 can prevent UAV 12 from spraying for a predetermined time period, such as 5, 10, or 15 seconds, until the user enters an override command, or until UAV 12 is confirmed to have regained the desired spray position. Control unit 20 thus prevents UAV 12 from spraying fluid at unexpected and undesired locations. In one example, location sensors 50 indicate UAV 12 shifting from the desired spray position. In another example, inertial sensors 52 indicate that UAV 12 experiencing an unexpected acceleration or movement.

In one example, control unit 20 deactivates spraying when UAV 12 experiences unexpected movement. Unexpected movement can result from a variety of causes, such as wind gusts; unexpected drag, such as due to a tether catching on an object; or UAV 12 bumping into an object, among other examples. For example, inertial sensors 52 can indicate that UAV 12 is experiencing acceleration. Control unit 20 compares the sensed acceleration of UAV 12 from inertial sensors 52 to the expected acceleration of UAV 12. It is understood, that the expected acceleration and the sensed acceleration can be either a positive acceleration or a negative acceleration. The expected acceleration can be prestored in control unit 20 according to the flight/spray plan, can be based on a user input, and/or can be calculated by control unit 20 based on other sensor data and inputs, among other options. When the sensed acceleration does not match the expected acceleration, control unit 20 deactivates spraying based on the unexpected movement. For example, the user can input a command for UAV 12 to move to a new location or accelerate in a particular direction, or UAV 12 can be operating autonomously and following a preprogramed flight plan. In both instances, inertial sensors 52 detect the acceleration, or other inertial information, and communicate the sensed acceleration to control unit 20. Control unit 20 compares the sensed acceleration to the expected acceleration, such as an acceleration profile expected for the particular user command, to determine if the movement was expected. In some examples, control unit 20 can compare the sensed acceleration to a threshold acceleration. If control unit 20 determines that the movement is expected, such that the sensed acceleration matches the expected acceleration or is below the threshold acceleration, control unit 20 takes no corrective action and UAV 12 continues spraying. If control unit 20 determines that the movement is unexpected, such that the sensed acceleration does not match the expected acceleration or exceeds the threshold acceleration, control unit 20 stops spraying and corrects the course of UAV 12.

In some examples, control unit 20 causes UAV 12 to immediately cease any fluid spraying where the movement is unexpected. For example, where control unit 20 senses that UAV 12 is experiencing an unexpected acceleration, control unit 20 causes a valve to close, such as the valve in nozzle 38 or spray tube 74, cutting off the supply of fluid to nozzle 38. In another example, control unit 20 causes inboard motor controller 32 to deactivate sprayer motor 58, thereby stopping pump 60.

Control unit 20 can include a force compensation routine configured to maintain the desired position of UAV 12 through the use of coordinate positioning software and reactive and predictive software tied to spray activation. During operation, the spray fan generates a spray force at nozzle 38 that drives UAV 12 rearward, away from the surface to be sprayed. To counteract the spray force and maintain UAV 12 in the desired spray position, control unit 20 executes a force compensation routine. It is understood that, in some examples, control unit 20 automatically implements the force compensation routine whenever spraying occurs. In other examples, control unit 20 implements the force compensation routine based on feedback from sensors 26. For example, control unit 20 can implement the force compensation routine based on location sensors 50 sensing a changing location of UAV 12 and/or inertial sensors 52 sensing movement of UAV 12.

Figure 2B:
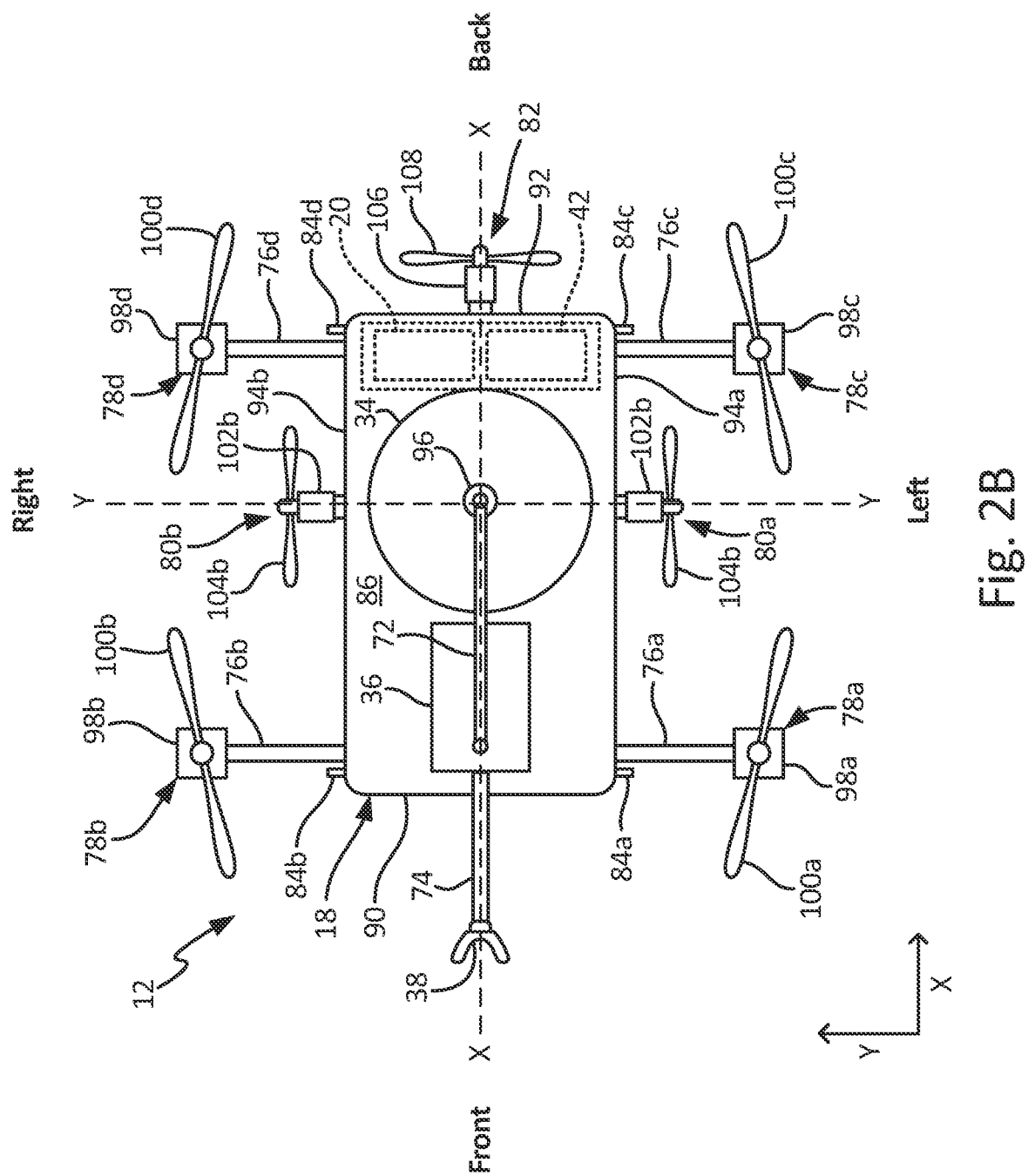
FIG. 2B is a plan view of an unmanned aerial vehicle.
Figure 2C:
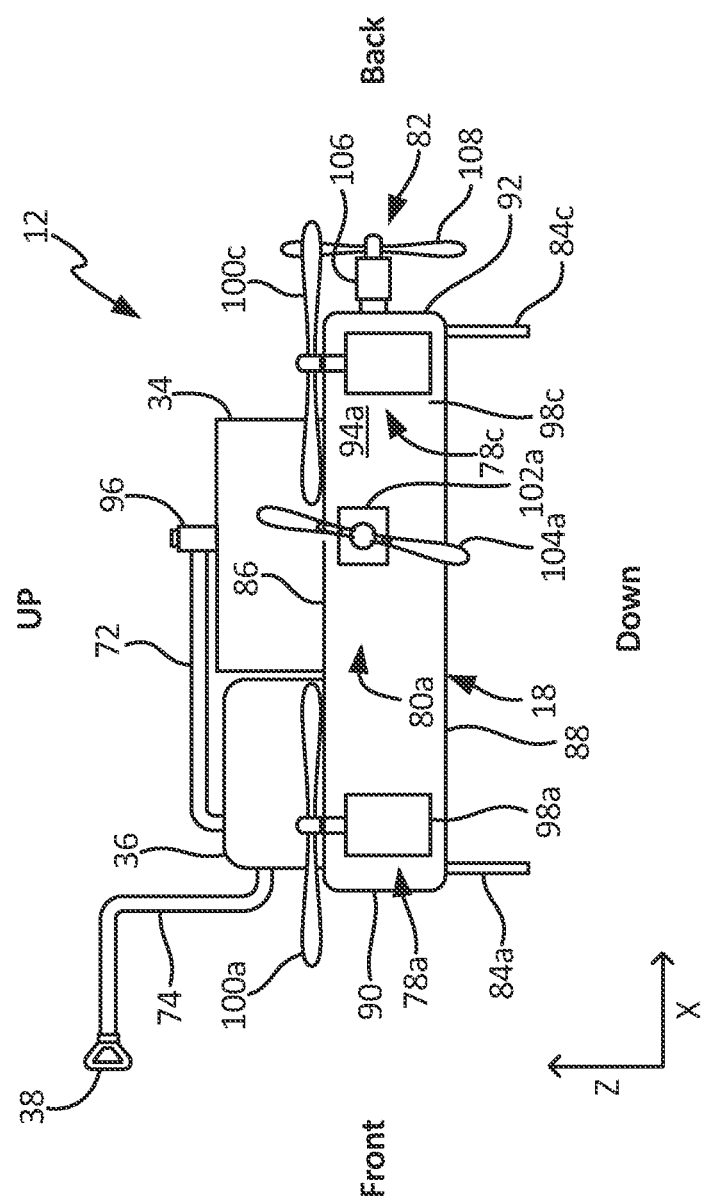
FIG. 2C is a side elevation view of an unmanned aerial vehicle.

As discussed above, rotors 30 can include a force compensation rotor, such as rear rotor 82 (best seen in FIGS. 2A-2C). To generate the required compensatory force, control unit 20 commands motor controller 28 to generate forward thrust with the force compensation rotor. The forward thrust acts opposite the rearward thrust generated at nozzle 38 to balance UAV 12 and maintain UAV 12 in the desired spray position. In some examples, control unit 20 can associate the force compensation with the spraying, such that the start spray command activates both the force compensation rotor and sprayer 36. For example, control unit 20 sends the start spray command to both inboard motor controller 32 and outboard motor controller 28. Inboard motor controller 32 and outboard motor controller 28 time the activation of sprayer motor 58 and the force compensation rotor, respectively, such that the force compensation rotor provides sufficient compensatory thrust as the spray begins to exit nozzle 38. In some examples, control unit 20 can delay the actual release of fluid through nozzle 38 for a set period of time, such as about 0.5 seconds, to allow time for the force compensation rotor to accelerate to speed.

In another example, control unit 20 can control the force compensation rotor based on the preassigned spray-on gates and spray-off gates. Control unit 20 deactivates the force compensation rotor as UAV 12 approaches the spray-off gate, thereby timing the complete cessation of compensatory forces with the cessation of spraying. Control unit 20 then activates the force compensation rotor as UAV approaches the spray-on gate, thereby timing the force compensation rotor reaching the desired speed with the start of spraying.

In some examples, the force compensation routine can be iteratively implemented, based on prior spraying events. For example, the control unit 20 stores information gathered from sensors 26 related to each spray event. Control unit 20 recognizes the frequency and timing with which the user turns the spray through nozzle 38 on and off, and the timing required for propeller 56 to accelerate to speed. Control unit 20 can then predict future on/off cycles based on the known frequency and timing and controls the force compensation rotor accordingly.

Control unit 20 can also provide a variable compensatory force. For example, control unit 20 can alter the compensatory force based on the actual spray force. In one example, location sensors 50 provide data regarding the distance to the surface being sprayed. When sprayer 36 begins spraying, control unit 20 incrementally increases the thrust generated by the force compensation rotor until UAV 12 maintains a steady distance from the surface. Control unit 20 can include software configured to estimate the spray forces generated based on a variety of factors, such as the weight of UAV 12, the distance to the surface, the pressure generated by pump 60, the size of the orifice at nozzle 38, and the volume of fluid remaining in reservoir 34, among others.

Control unit 20 is configured to automatically detect and remove a clog during spraying. For example, sprayer sensors 26 can detect a clog in the orifice of nozzle 38, and control unit 20 implements an unclog routine in response to the detected clog. In some examples, sprayer sensor 26 is a pressure sensor configured to sense a rise in fluid pressure downstream of pump 60 during spraying. In other examples, sprayer sensor 26 is an optical sensor that indicates an unexpected change in spray fan. It is understood, however, that sprayer sensor 26 can be any suitable sensor for detecting the presence of the clog in nozzle 38. Where sprayer sensors 26 indicate a clog, control unit 20 automatically initiates the unclog procedure. Control unit 20 stops spraying by closing the valve in nozzle 38 and/or deactivating sprayer motor 58. Avionics module 24 maneuvers UAV 12 such that nozzle 38 is pointing away from the surface, preventing the clog from ejecting onto the surface. Control unit 20 activates an unclogging mechanism located on nozzle 38, such as de-clog mechanism 144 (shown in FIGS. 5A-5B), to shift nozzle 38 to an unclog orientation. Control unit 20 activates sprayer motor 58 and/or opens the valve in nozzle 38, resuming spraying and driving the pressurized fluid through nozzle 38. The pressurized fluid ejects the clog from nozzle 38. Control unit 20 deactivates sprayer motor 58 and/or closes the valve in nozzle 38. Avionics module 24 maneuvers UAV 12 back to the spray position where the clog was initially detected, and the unclogging mechanism adjusts nozzle 38 back to a spraying orientation. Control unit 20 issues the spray command, the valve in nozzle 38 is opened, sprayer motor 58 is activated, and UAV 12 continues the spraying process.

UAV 12 provides significant advantages. UAV 12 provides fluid spraying at locations that are inaccessible or inefficient for humans to access. UAV 12 can operate autonomously, saving time and energy of the user. Control unit 20 includes software configured to maintain UAV 12 in the desired spraying position throughout the spray process. Maintaining UAV 12 in the desired spray position provides a high quality, even finish on the surface. In addition, control unit 20 compensates for unexpected events, such as movement or acceleration, and for additional forces, such as the spray force generated at nozzle 38, to ensure that UAV 12 applies a high quality finish at the desired locations. Control unit 20 recognizes unexpected acceleration of UAV 12 and deactivates spraying in response to unexpected acceleration, thereby preventing UAV 12 from spraying fluid on undesired surfaces or at undesired locations. Control unit 20 further automatically detects and ejects clogs that can adversely impact the spray operation.

FIG. 2A is a front elevation view of UAV 12. FIG. 2B is a plan view of UAV 12. FIG. 2C is a side elevation view of UAV 12. FIGS. 2A-2C will be discussed together. UAV 12 includes body 18, reservoir 34, sprayer 36, nozzle 38, supply tube 72, spray tube 74, arms 76a-76d (collectively herein "arms 76"), lift rotors 78a-78d (collectively herein "lift rotors 78"), lateral rotors 80a-80b (collectively herein "lateral rotors 80"), rear rotor 82, landing struts 84a-84d (collectively herein "landing struts 84"), power source 42, and sensors 26a-26c (collectively "sensors 26"). Body 18 includes top 86, bottom 88, front 90, rear 92, first lateral side 94a, and second lateral side 94b. Reservoir 34 includes fluid port 96. Lift rotors 78a-78d include lift motors 98a-98d (collectively herein "lift motors 98") and lift propellers 100a-100d (collectively herein "lift propellers 100"), respectively. Lateral rotors 80a-80b include lateral motors 102a-102b (collectively herein "lateral motors 102") and lateral propellers 104a-104b (collectively herein "lateral propellers 104"), respectively. Rear rotor 82 includes rear motor 106 and rear propeller 108. A center of gravity of UAV 12 is disposed at the intersection of longitudinal axis X-X, lateral axis Y-Y, and vertical axis Z-Z.

Body 18 houses various electronic components of UAV 12, such as power source 42 and control unit 20. Power source 42 can be a battery or an external power source connected to UAV 12, and can provide power to all components onboard UAV 12, such as motors, sensors, microprocessors, communication modules, and circuitry, among others. Control unit 20 is configured to store instructions and to implement functionality and process instructions to control flight of UAV 12 and spraying by UAV 12. Body 18 can be made of any suitably lightweight material. In some examples, body 18 is a lightweight plastic. For example, body 18 can be formed from acrylonitrile butadiene styrene, polycarbonate, and/or polyamide, among others.

Landing struts 84 extend from body 18 and support UAV 12 on the ground. Arms 76 extend from body 18 of UAV 12. As shown, arm 76a and arm 76c extend from first lateral side 94a of body, and arm 76a and arm 76d extend from second lateral side 94b of body 18. It is understood, however, that arms 76 can extend from any desired portion of body 18. For example, body 18 can be cylindrical and arms 76 can extend from body at evenly-spaced intervals. For example, arms 76 can be spaced at 90° intervals where UAV 12 includes four arms 76, and arms 76 can be spaced at 120° intervals where UAV 12 include three arms 76. While UAV 12 is shown having four arms 76 and four lift rotors 78, making UAV 12 a "quadcopter," it is understood that UAV 12 can be of any desired configuration, such as a tri-copter (with three lift rotors 78), a hexa-copter (with six lift rotors 78), or any other desired configuration.

Lift rotors 78a-78d are disposed at the distal ends of arms 76a-76d, respectively, and are configured to provide lift and propulsion to UAV 12. Lift motors 98a-98d are mounted on arms 76a-76d, respectively, and provide power to lift propellers 100a-100d, respectively. Lift motors 98 can be any suitable motor for providing rotational power to propellers 56, such as a brushless electric motor, for example. Lift propellers 100 are positioned and angled to provide vertical lift to UAV 12, but it is understood that lift motors 98 can individually tilt lift propellers 100 to cause lift propellers 100 to provide lateral propulsion to UAV 12 and to facilitate turning.

Lateral rotor 80a is disposed on first lateral side 94a of body 18, and lateral rotor 80b is disposed on second lateral side 94b of body. Lateral rotors 80 are oriented to provide lateral, rather than vertical, thrust to UAV 12. Lateral motor 102a extends from first lateral side 94a and provides power to lateral propeller 104a. Lateral motor 102b extends from second lateral side 94b and provides power to lateral propeller 104b. Similar to lift motors 98, lateral motors 102 can be any suitable motor for providing rotational power to lateral propellers 104, such as brushless electric motors, for example. Rear rotor 82 is disposed at rear 92 of body 18. Rear rotor 82 is configured to generate forward thrust for UAV 12. Rear motor 106 extends from rear 92 and provides power to rear propeller 108. Rear motor 106 can be any suitable motor for providing rotational power to rear propeller 108, such as brushless electric motors, for example. In some examples, rear rotor 82 is a force compensation rotor configured to generate a compensatory force during spraying. In some examples, UAV 12 can include additional arms, similar to arms 76, on which lateral rotors 80 and rear rotor 82 are mounted. As such, lateral rotors 80 and rear rotor 82 can be spaced laterally and/or vertically relative to body 18.

Reservoir 34 and sprayer 36 are supported by body 18. In some examples, reservoir 34 is formed integrally within body 18, such that body 18 defines reservoir 34. In other examples, reservoir 34 is formed separately and installed on body 18. In some examples, reservoir 34 is configured to be inserted through top 86 of body 18 and receive fluid through the top of reservoir 34, providing easy access to reservoir 34 to the user. Fluid port 96 is disposed on reservoir 34 and can provide fluid to reservoir 34 during refill or during flight, such as via a tether connected to UAV 12. Supply tube 72 extends from fluid port 96 of reservoir 34 to sprayer 36 and provides fluid to sprayer 36 from reservoir 34. Sprayer 36 is supported by body 18 between reservoir 34 and nozzle 38. Sprayer 36 is configured to draw fluid from reservoir 34, pressurize the fluid, and drive the fluid downstream to nozzle 38. For example, sprayer 36 can include a pump and a motor to drive the pump. Spray tube 74 extends between sprayer 36 and nozzle 38 and provides pressurized fluid to sprayer 36. Nozzle 38 is configured to atomize the fluid and generate a spray fan for application on the surface.

Reservoir 34 is disposed on body 18 such that center of reservoir 34 is aligned with the center of mass of UAV 12. As such, regardless of the volume of fluid within reservoir 34, the center of mass of UAV 12 remains in approximately the same relative location throughout the spraying process. Maintaining the center of mass of UAV 12 in the same relative location throughout the spraying process prevents fluid depletion from causing destabilizing UAV 12.

Spray tube 74 extends from pump 60 and can be oriented to locate nozzle 38 at any desired location. As shown, nozzle 38 is disposed above each lift rotor 78. Positioning nozzle 38 above lift rotors 78 prevents the thrust wash generated by lift propellers 100 from disrupting the spray pattern exiting nozzle 38, which can create overspray. Nozzle 38 can be located at any desired distance above lift propellers 100 to prevent overspray, such as 5 inches, 10 inches, 20 inches, 30 inches, or any other desired distance. Nozzle 38 is also, in some examples, positioned forward from other components of UAV 12, such as forward of lift rotors 78. As such, nozzle 38 is closer to the surface than other components of and portions of UAV 12. Positioning nozzle 38 forward of the other components of UAV 12 prevents the thrust wash from disrupting the spray fan. In some examples, nozzle 38 is aligned with the center of mass of UAV 12, at least along the longitudinal axis, such that the force of the fluid exiting nozzle 38 does not create a turning moment about the vertical axis. As such, as fluid exits nozzle 38 no additional energy is required to maintain stability and alignment of UAV 12.

Sensor 26a is disposed on arm 76a, sensor 26b is disposed on arm 76b, and sensor 26c is disposed on front 90 of body 18. It is understood, however, that sensors 26 can be disposed at any desired location on UAV 12. Sensors 26 can be of the same or different types, and are configured to provide data regarding the location and orientation of UAV 12. Sensors 26 can locate objects and features to assist in automated flight and navigation of UAV 12, and sensors 26 can output signals to control unit 20 to control autonomous or semi-autonomous flight. As discussed above, sensors 26 can include location sensors, such as location sensor 50 (shown in FIG. 1), inertial sensors, such as inertial sensor 52 (shown in FIG. 1), and/or optical sensors, such as optical sensor 48 (shown in FIG. 1). As such, sensors 26 can include one or more of cameras, radar transducers, ultrasonic and/or acoustic rangefinders, laser rangefinders, magnetometers, radar, and lidar, amongst other options.

Sensors 26a-26c are arranged laterally and equidistantly along the lateral axis, relative to nozzle 38. It is understood, however, that sensors 26 can also or additionally be spaced laterally and equidistantly relative to nozzle 38 along the vertical axis. Spacing sensors 26a-26c equidistantly relative to nozzle 38 ensures that nozzle 38 is properly positioned during spraying because sensors 26 can provide locational data to ensure that nozzle 38 of UAV 12 is orthogonal to the surface throughout the spray process. For example, sensor 26a is located at lift motor 98a and sensor 26b is located at lift motor 98b, and both sensor 26a and sensor 26b are equidistant from nozzle 38. Where sensor 26a and sensor 26b sense the same distance to the surface, then control unit 20 knows that nozzle 38 is orthogonal to the surface. If one of sensors 26a or 26b indicates a different distance than the other of sensors 26a and 26b, then control unit 20 knows that nozzle 38 is not orthogonal to the surface. Control unit 20 can take corrective action to reorient UAV 12 to the desired spraying position. While control unit 20 is described as taking corrective action when UAV 12 is not orthogonal to the surface, it is understood that control unit 20 can maintain UAV 12 in any desired spray orientation. In some examples, a non-orthogonal spray fan provides a satisfactory finish, so long as the spraying orientation is maintained throughout each spray pass.

During operation UAV 12 is configured to spray fluids, such as paint, on surfaces that are difficult for humans to easily access and/or efficiently apply the fluid. In some examples, UAV 12 applies fluid to a surface using a plurality of parallel, raster passes. A raster pass occurs when a first horizontal or vertical stripe is applied to a surface, and the second horizontal or vertical stripe is applied directly adjacent and/or overlapping with the first stripe. Any number of stripes can be applied until the surface is sufficiently painted. For example, UAV 12 can apply a stripe having X width with each pass. UAV 12 can be programmed to provide a 50% overlap with each pass, such that UAV 12 will shift X/2 relative to the first stripe before the next stripe is applied. The amount of overlap can be any desired value as determined by the user or the particular application, from about 0% to about 100%.

Reservoir 34 stores a supply of fluid for application to the desired surface. Sprayer 36 is activated, autonomously by control unit 20 or by the user, and sprayer 36 draws the fluid out of reservoir 34 through supply tube 72. Sprayer 36 pressurizes the fluid and drives the fluid downstream to nozzle 38. Sprayer 36 is configured to generate a high pressure (e.g. 500-4000 psi) fluid flow, sufficient to cause nozzle 38 to atomize the fluid as the fluid exits nozzle 38. The pressure required to atomize the fluid generates a rearward force at nozzle 38. UAV 12 is configured to counteract the rearward force generated at nozzle 38 during spraying to ensure that nozzle 38 remains in the desired position throughout spraying. For example, nozzle 38 can be aligned with the center of gravity of UAV 12 to prevent the spray force from generating a turning moment and/or rear rotor 82 can act as the force compensation rotor.

In some examples, rear rotor 82 provides counter-propulsion to counteract and balance the spray forces generated during spraying. Rear rotor 82 is configured to maintain the desired position of UAV 12 based on coordinate positioning software and reactive and predictive software tied to a spray activation, which can be stored on and executed by control unit 20. Rear rotor 82 generates the required thrust to maintain the desired spacing between nozzle 38 and the surface being sprayed. Rear propeller 108 is positioned to provide rearward thrust to push UAV 12 forward and counteract the force generated at nozzle 38. Rear propeller 108 is positioned to cancel the spray force, and as such rear propeller 108 is aligned with nozzle 38, center of gravity of UAV 12, or both. For example, where nozzle 38 is elevated above lift rotors 78, rear rotor 82 can be mounted on an arm to similarly position rear rotor 82 above lift rotors 78 and into alignment with nozzle 38 on both the vertical plane and longitudinal plane. Rear motor 106 is further configured to tilt rear propeller 108 to counteract any moment generated by nozzle 38 being offset from rear rotor 82.

Lateral rotors 80 are oriented to provide lateral, rather than vertical, thrust to UAV 12. The lateral thrust provided by lateral rotors 80 drives UAV 12 during horizontal spray passes. Providing lateral thrust from lateral rotors 80 takes load off of lift rotors 78, which would otherwise provide the lateral thrust through pitching of lift propellers 100. Driving UAV 12 laterally with lateral rotors 80 provides smooth lateral movement, ensuring even and steady spraying by UAV 12. In some examples, lateral rotors 80 are controlled to prevent drifting of UAV 12 during operation. For example, sensors 26 can sense that UAV 12 is drifting laterally, due to a gust of wind or steady breeze, and control unit 20 activates one of lateral rotors 80 to counteract the lateral drift.

An example spray event where UAV 12 applies horizontal stripes will be discussed. Lift rotors 78 provide lift to UAV 12. Control unit 20 can include a preprogrammed flight plan for autonomous operation of UAV 12. Control unit 20 can also communicate with a user to receive commands from the user to control UAV 12. Based on input commands from control unit 20, either preprogrammed or user supplied, UAV 12 flies to a desired start location. Information from sensors 26 informs control unit 20 that UAV 12 is at the desired start location and at a desired distance from the surface.

With UAV 12 in the desired start location, control unit 20 activates sprayer 36. Sprayer 36 draws fluid from reservoir 34 through supply tube 72, pressurizes the fluid, and drives the fluid to nozzle 38 through spray tube 74. Control unit 20 activates rear rotor 82 to compensate for the force generated by the spray through nozzle 38. Control unit 20 also activates lateral rotor 80a to drive UAV 12 laterally along a first horizontal spray path of the flight plan. UAV 12 continues to spray and move laterally along the horizontal spray path until UAV 12 reaches the end of the first horizontal spray path. Control unit 20 recognizes the end of the first horizontal spray path based on information from sensors 26, input from the user, or any other desired indicator.

At the end of the first horizontal spray path, control unit 20 stops the spray, by cutting power to sprayer 36 or closing a valve in nozzle 38, among other examples. Stopping the spray prevents overspray at the end of the first horizontal path. Control unit 20 also stops lateral rotor 80a and rear rotor 82. Lift rotors 78 are thus providing all motive force to UAV 12. In some examples, control unit 20 can cause nozzle 38 to rotate from the vertical spray orientation to a horizontal spray orientation as UAV 12 transitions vertically to the second horizontal spray path. UAV 12 can then apply a vertical stripe as the UAV 12 transitions to the second horizontal spray path.

UAV 12 transitions to the second horizontal spray path, and control unit 20 confirms that UAV 12 is in the proper start positon for the second horizontal spray path. When control unit 20 confirms that UAV 12 is properly positioned to apply the second horizontal spray path, control unit 20 activates sprayer 36, rear rotor 82, and lateral rotor 80b. Rear rotor 82 provides the compensatory force to counter the force generated by the spray exiting nozzle 38. Lateral rotor 80b drives UAV 12 along the second horizontal spray path until UAV 12 reaches the end of the second horizontal spray path. At the end of the second horizontal spray path control unit 20 ceases spraying, deactivates rear rotor 82 and lateral rotor 80b, and transitions UAV 12 to a third horizontal spray path. UAV 12 reverses course and applies the fluid along the third horizontal spray path.

UAV 12 provides significant advantages. UAV 12 provides quick and efficient painting at locations that are inaccessible or inefficient for a human painter. Reservoir 34 provides an onboard supply of fluid for UAV 12. Reservoir 34 is aligned with center of gravity of UAV 12, which prevents reservoir 34 from generating a turning moment as fluid is withdrawn from reservoir 34 during spraying. Nozzle 38 provides an airless spray fan for application on the surface. Nozzle 38 is aligned with center of gravity of UAV 12 to prevent the spray force generated at nozzle 38 from creating a turning moment. UAV 12 provides spray force compensation with rear rotor 82, ensuring both the stability UAV 12 during spraying and the uniform application of the fluid. UAV 12 also includes lateral rotors 80 that prevent drift and drive UAV 12 along lateral spray paths. Driving UAV 12 with lateral rotors 80 prevents UAV 12 from pitching and takes load off of lift rotors 78. UAV 12 further includes sensors 26 that are laterally spaced and are equidistant relative to nozzle 38. Spacing sensors 26 laterally and equidistantly enables UAV 12 to sense an exact position and orientation relative to the surface, and allows control unit 20 to provide minor, autonomous corrections to the path of UAV 12. Control unit 20 thereby ensures that nozzle 38 remains in the desired spray position relative to the surface. Sensors 26 also include inertial sensors to detect movement and acceleration of UAV 12. Control unit 20 controls the spray based on the sensed inertial data, thereby preventing UAV 12 from spraying at undesired locations and in an undesired manner. Nozzle 38 is also located above and forward of lift rotors 78, preventing lift rotors 78 from generating overspray.

FIG. 3A is an isometric view of pump 60 and drive 110. FIG. 3B is a cross-sectional view of pump 60 taken along line 3-3 in FIG. 3A. FIGS. 3A and 3B will be discussed together. Pump 60 includes pump housing 112, piston 114, cylinder 116, and pump check valve 118. Pump housing 112 includes pump inlet 120, outlet 122, axial bore 124, radial bore 126, and common bore 128. Drive 110 includes gear 130 and wobble plate 132. Sprayer motor 58 includes pinion 134.

Pump housing 112 defines a fluid path for fluid to flow between a reservoir, such as reservoir 34 (shown in FIGS. 2A-2C), and spray tube 74. Pump inlet 120 extends into pump housing 112 and is configured to receive fluid entering pump 60. Pump inlet 120 can be directly connected to supply tube 72 (best seen in FIG. 2A) to receive the fluid from reservoir 34. Radial bore 126 extends from pump inlet 120 to axial bore 124, providing a flow path for the fluid to flow to axial bore 124.

Cylinder 116 is disposed within axial bore 124, and piston 114 extends into axial bore 124 and cylinder 116 from outside of pump housing 112. Piston 114 extends into pump housing 112 from drive 110. Piston 114 is configured to draw fluid into cylinder 116 during a suction stroke and to drive fluid out of cylinder 116 during a pumping stroke. Piston 114 and cylinder 116 can be formed of any suitable material for driving fluid from reservoir 34 to nozzle 38, such as carbide, among other options. Pump check valve 118 is disposed within pump body 18 downstream of piston 114. Outlet 122 is disposed downstream of pump check valve 118. Fluid exits pump housing 112 through outlet 122. Outlet 122 can receive spray tube 74, which routes the fluid to a nozzle, such as nozzle 38 (best seen in FIGS. 5A-5B), from pump 60. Outlet 122 can be connected to spray tube 74 in any desired manner, such as a threaded connection or a press-fit connection, among other options. Pump housing 112 can be formed of any suitable material for housing the pumping components and routing fluid, such as polymer or metal.

In some examples, pump 60 can include multiple pistons 114. Each of the pistons 114 is connected to and driven by drive 110. Pump 60 can include as many or as few pistons as desired to generate the desired spray pressure to provide an atomized spray through nozzle 38. For example, pump 60 can include a single piston, two pistons, three pistons, or more. Where pump 60 includes multiple pistons 114, multiple radial bores 126 extend from pump inlet 120 to multiple axial bores 124 in pump housing 112. Common bore 128 extends to each axial bore 124 and provides a flow path for the fluid to flow from each axial bore to outlet 122. As such, each piston 114 drives fluid to outlet 122.

Drive 110 translates rotational motion from sprayer motor 58 into linear, reciprocal motion of piston 114. Sprayer motor 58 can be an electric motor, such as a high or low voltage electric brushless or brushed motor, a gas motor, or a pneumatic motor, among other options. When activated, sprayer motor 58 provides rotational motion to pinion 134. Pinion 134 is intermeshed with gear 130 and drives gear 130. Gear 130 in turn drives wobble plate 132, and wobble plate 132 converts the rotational input from gear 130 into linear, reciprocal motion of piston 114. While drive 110 is shown as a wobble drive, it is understood that drive 110 can include any suitable device for converting the rotational motion of sprayer motor 58 into linear, reciprocating motion of piston 114. For example, drive 110 can include various yokes, cranks, and other devices.

Pump 60, drive 110, and sprayer motor 58 form sprayer 36 of UAV 12, and can be disposed in a single housing on UAV 12. For example, UAV 12 can include a molded clamshell to encase pump 60, drive 110, and sprayer motor 58. The clamshell can include ribs to support the components, and can be made of any suitable material, such as polymer.

During operation, sprayer motor 58 is activated when UAV 12 is in a desired spray position. Sprayer motor 58 drives pinion 134 in a rotational manner, and pinion 134 drives gear 130. Gear 130 drives wobble plate 132, and wobble plate 132 drives piston 114 in a linear, reciprocating manner within cylinder 116. During a suction stroke, wobble plate 132 pulls piston 114 rearwards, away from pump check valve 118, which creates a vacuum condition in cylinder 116. The vacuum draws fluid into cylinder 116 through pump inlet 120 and radial bore 126. Piston 114 continues through the suction stroke until wobble plate 132 reverses direction and drives piston 114 forward through a pressure stroke. During the pressure stroke, wobble plate 132 pushes piston 114 forward through cylinder 116, towards pump check valve 118. The pressure within cylinder 116 builds until the pressure overcomes the force maintaining pump check valve 118 in the closed position. Pump check valve 118 then shifts to the open position. With pump check valve 118 open, the fluid is driven downstream out of cylinder 116 and to spray tube 74 through outlet 122. While pump 60 is described as a piston pump, it is understood that pump 60 can be of any desired configuration for driving fluid. For example, pump 60 can have any desired number of pistons or can be a diaphragm pump, a rotor-stator pump, or a peristaltic pump, among other options. Sprayer 36 provides significant advantages. Sprayer 36 provides a compact, lightweight device for generating a high pressure spray during flight.

FIG. 4 is a cross-sectional view of peristaltic pump 60'. Peristaltic pump 60' includes pump housing 136, flow tube 138, arms **140*a*-140*b*, and rollers 142*a*-142*b*. Flow tube 138 extends about a periphery of pump housing 136 and is configured to route fluid through peristaltic pump 60'. Flow tube 138 includes fluid inlet 139 and fluid outlet 141. Sprayer motor 58 extends into pump housing 136, and arms 140*a*-140*b* extend radially from sprayer motor 58. Rollers 142*a*-142*b* are mounted at the distal ends of arms 140*a*-140*b***, respectively.

During operation, sprayer motor 58 rotates arms **140*a*-140*b* within pump housing 136. Fluid enters flow tube 138 through fluid inlet 139, flows through flow tube 138 within pump housing 136, and exits downstream through fluid outlet 141. Rollers 142*a*-142*b* compress flow tube 138 against the inner surface of pump housing 136 and force the fluid through flow tube 138 as rollers 142 continue to rotate within pump housing 136. Rollers 142 thus compress flow tube 138** and drive the fluid in a wave-like manner.

FIG. 5A is an isometric view of nozzle 38, spray tube 74, and de-clog mechanism 144. FIG. 5B is a cross-sectional view of nozzle 38, spray tube 74, and de-clog mechanism 144 taken along line 5-5 in FIG. 5A. FIGS. 5A and 5B will be discussed together. Spray tube 74 includes tip valve 146 and valve controller 148. Nozzle 38 includes rotatable tip 150, orifice 152, and tip bore 154. Valve controller 148 includes actuator 156 and plunger 158. Rotatable tip 150 includes barrel 160 and tip gear 162. Orifice 152 includes first end 164 and second end 166. De-clog mechanism 144 includes de-clog motor 168 and de-clog gear 170.

Tip valve 118 is disposed within spray tube 74 and is configured to control the flow of fluid out of spray tube 74 and to nozzle 38. Tip valve 118 can be any desired one-way valve, such as a needle valve, a ball check valve, or any other suitable valve for controlling the flow to nozzle 38 from spray tube 74. Valve controller 148 is mounted on and extends into spray tube 74. Actuator 156 controls the movement of plunger 158, and plunger 158 extends into spray tube 74 and interfaces with tip valve 118. In some examples, plunger 158 extends into spray tube 74 through a seal to prevent leakage around plunger 158. Actuator 156 is connected to a power source, such as power source 42 (FIG. 1), by wire 172.

Nozzle 38 is mounted on spray tube 74. Rotatable tip 150 extends into tip bore 154 through nozzle 38 and can be rotated between a spraying position and an opposite, de-clog position. Barrel 160 is elongate and is disposed in tip bore 154. Tip gear 162 is disposed at the distal end of barrel 160 and can project outside of tip bore 154. Orifice 152 is disposed in barrel 160 of rotatable tip 150. First end 164 of orifice 152 is configured to generate the spray fan, and second end 166 of orifice is configured to blow out a tip clog. The opening through first end 164 is narrower than the opening through second end 166. With rotatable tip 150 in the spraying position, first end 164 points out of nozzle 38, and all fluid exits through first end 164 of orifice 152. First end 164 atomizes the fluid and generates a spray fan for application of the fluid on the surface. For example, first end 164 can have a cat-eye shape to produce a relatively flat spray fan. In some examples, the cat-eye shape can include a relatively flat long side to produce a flatter, sharper spray fan. With rotatable tip 150 in the de-clog position, second end 166 of orifice faces outward from nozzle 38, and the fluid exits spray tube 74 and nozzle 38 through second end 166.

De-clog mechanism 144 is mounted on spray tube 74 and is configured to rotate rotatable tip 150 between the spraying position and the de-clog position. De-clog motor 168 is mounted on spray tube 74 and is connected to a power source, such as power source 42, by wire 174. De-clog gear 170 is rotatably driven by de-clog motor 168. De-clog gear 170 interfaces with tip gear 162 and is configured to drive the rotation of rotatable tip 150. De-clog motor 168 can be a stepper motor, among other examples.

During operation, tip valve 118 controls the flow of the fluid downstream out of spray tube 74. When tip valve 118 is in an open position, the fluid flows downstream to nozzle 38 and is sprayed through orifice 152. In some examples, tip valve 118 is a pressure actuated valve such that the fluid pressure causes tip valve 118 to shift from the closed position to the open position. In other examples, valve controller 148 controls the actuation of tip valve 118 between the closed position and the open position. In one example, plunger 158 is positioned to drive tip valve 118 to the open position and to similarly drive tip valve 118 back to the closed position.

In another example, tip valve 118 is a hybrid check valve that is partially pressure controlled and partially electrically controlled. Valve controller 148 prevents tip valve 118 from shifting to the open position and causes tip valve 118 to shift to the closed position if tip valve 118 is open when valve controller 148 is activated. The fluid pressure can cause tip valve 118 to shift to the open position. For example, actuator 156 can be a solenoid configured to control tip valve 118 with plunger 158. Based on an electrical signal provided through wire 172, actuator 156 drives plunger 158 into the flowpath through spray tube 74. Plunger 158 is positioned to prevent tip valve 118 from shifting to the open position, such that tip valve 118 is locked in the closed position whenever piston 114 is deployed. When spraying is desired, another electrical signal is sent via wire 172 and actuator 156 retracts plunger 158 from spray tube 74, thereby allowing tip valve 118 to open. In some examples, plunger 158 is positioned on tip valve 118 or within spray tube 74 such that deploying plunger 158 immediately closes the flow path through tip valve 118. For example, plunger 158 can drive tip valve 118 to the closed position or plunger 158 can be dimensioned to block the full diameter of spray tube 74 when deployed. Plunger 158 blocking all flow out of spray tube 74 allows for quick cessation of spraying to prevent the fluid from being applied at undesired locations. For example, where inertial sensors 52 (FIG. 1) detect an unexpected acceleration, control unit 20 (FIG. 1) sends an electrical signal to actuator 156 along wire 172. Actuator 156 shifts plunger 158 to the deployed position based on the electrical signal. The spray through nozzle 38 is immediately stopped by plunger 158 to prevent any unintended spray.

In some examples, the opening of tip valve 118 can be coordinated with positional data obtained by sensors 26 (best seen in FIG. 1). For example, valve controller 148 can be configured to maintain tip valve 118 in the closed position whenever the electrical signal is not applied through wire 172. As such, valve controller 148 will allow tip valve 118 to open only when control unit 20 sends a start spray signal that causes valve controller 148 to shift to an open position. The start spray signal is generated only when the sensors indicate that UAV 12 is at a desired spraying position and location.

Figure 4:
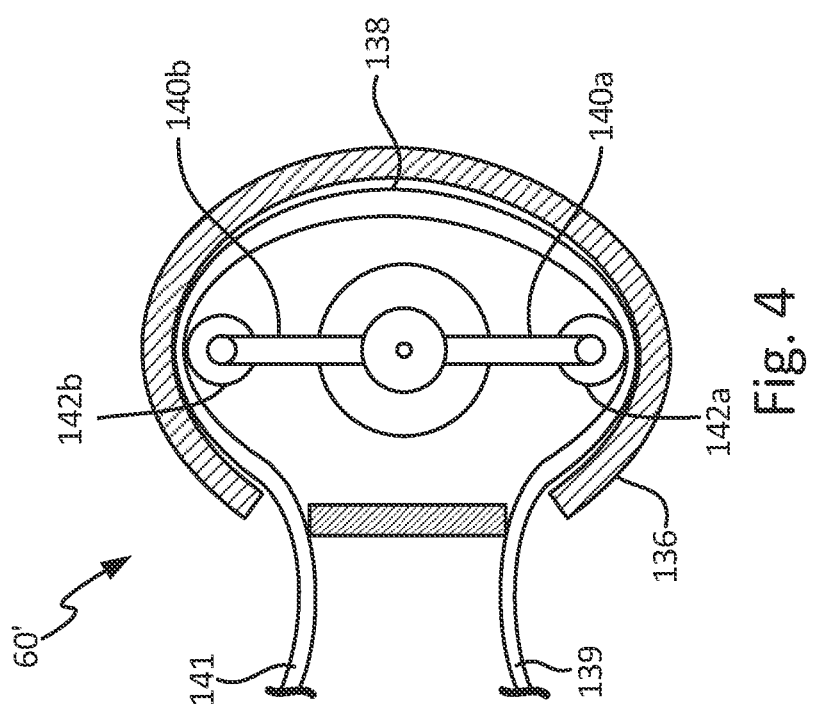
FIG. 4 is a cross-sectional view of a pump.
Figure 8A:
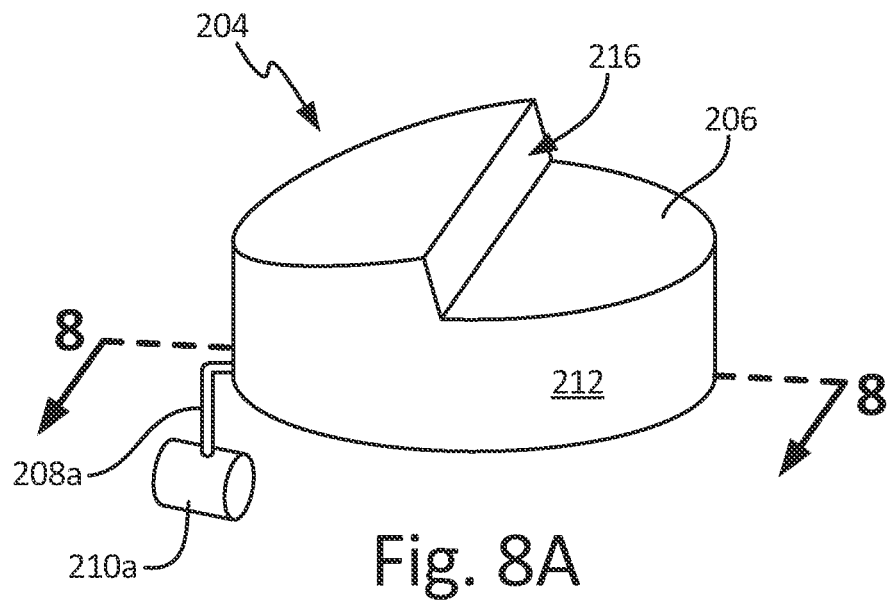
FIG. 8A is an isometric view of a propeller cover.
Figure 8B:
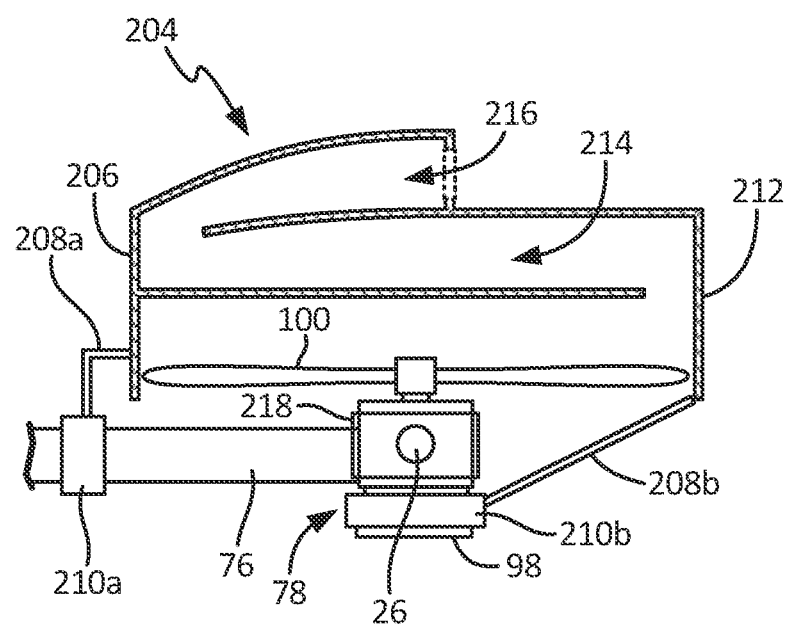
FIG. 8B is a cross-sectional view of the propeller cover of FIG. 8A taken along line 8-8 in FIG. 8A.

During operation, fluid and other debris can build up within orifice 152 and create a clog. The clog must be removed before continuing to spray. In response to the clog, rotatable tip 150 is rotated from the spray position (shown in FIG. 4B), where first end 164 of orifice 152 faces outwards, to the de-clog position, where second end 166 of orifice faces outwards. The fluid pressure within spray tube 74 ejects the clog from orifice 152 through second end 166. When the clog is detected, a de-clog command is provided to de-clog motor 168 through wire 174. For example, the de-clog command can be an electrical signal causing de-clog motor to activate. The de-clog command can also be sent to valve controller 148 to cut off flow through nozzle 38. As such, the de-clog command causes valve controller 148 to shift tip valve 118 to the closed position and causes de-clog mechanism 144 to rotate rotatable tip 150 to the de-clog position. De-clog motor 168 activates and drives de-clog gear 170. De-clog gear 170 rotates tip gear 162 and thus rotatable tip 150 to the de-clog position. A spray command is provided to valve controller 148 to cause valve controller 148 to withdraw plunger 158. The sprayer is activated, and the fluid pressure blows clog out of second end 166 of orifice 152. With the clog ejected, valve controller 148 recloses the flow path through spray tube 74, and de-clog mechanism 144 rotates rotatable tip 150 back to the spraying position. Nozzle 38 is thus ready to continue spraying.

UAV 12 can automatically detect a clog and can automatically initiate the de-clog routine. For example, a rise in fluid pressure downstream of the pump can be detected by a sensor, such as sprayer sensor 26 (FIG. 1), which indicates that the fluid is not being released downstream through nozzle 38. In some examples, a camera can detect the presence and quality of the spray fan produced by orifice 152. An alteration of the spray fan can indicate a tip clog. When a tip clog is detected, the de-clog procedure can be automatically initiated, by control unit 20 for example. The user can also initiate the de-clog procedure. For example, the user can input a de-clog command into a user interface, such as user interface 70 (FIG. 1), to initiate the de-clog routine.

Nozzle 38 provides significant advantages. Rotatable tip 150 is rotatable between the spraying position and the de-clog position, allowing clogs to be blown out of orifice 152. De-clog mechanism 144 engages tip gear 162 and drives rotatable tip 150 between the spraying position and the de-clog position. De-clog mechanism 144 allows clogs to be automatically blown out of orifice 152 while mid-flight, saving time and increasing the efficiency of the spray process. Valve controller 148 quickly shuts off flow through nozzle 38, cutting off spray and ensuring that the fluid is not applied at undesired locations. Moreover, valve controller 148 prevents undesired spray by locking tip valve 118 closed unless UAV 12 is in a desired spray location and is in the desired spray orientation.

FIG. 6 is a cross-sectional view of fluid reservoir 34. Fluid reservoir 34 includes supply tube 72, fluid port 96, intake flow tube 138, base 176, lid 178, and liner 180. Fluid port 96 includes valve 184. Base 176 defines chamber 186 and includes windows 188. Liner 180 includes lip 189. Lid 178 is attached to base 176, and liner 180 is secured between lid 178 and base 176. Base 176 can be of any desired material, such as polymer. Fluid port 96 extends through on lid 178, and fluid can be introduced to reservoir 34 through fluid port 96. Intake flow tube 138 extends from fluid port 96 into liner 180. Supply tube 72 extends from fluid port 96 to sprayer 36 (best seen in FIG. 1). Valve 184 is disposed in fluid port 96.

Base 176 provides structural support for the other components of reservoir 34. In some examples, base 176 is integrally formed on body 18 of UAV 12. In other examples, base 176 is formed separate from UAV 12 and can be attached to UAV 12. Windows 188 extend through base 176, allowing access to liner 180 from outside of base 176. In some examples, base 176 does not include windows 188 and can be cup-shaped and configured to hold fluid within chamber 186 without leakage. As such, base 176 can directly store the supply of fluid in chamber 186.

Liner 180 is disposed within chamber 186 and secured between base 176 and lid 178. Liner 180 stores the supply of fluid prior to application. Lip 189 of liner 180 is secured at the interface of lid 178 and base 176 between lid 178 and base 176. Intake flow tube 138 extends into liner 180 from fluid port 96, and intake flow tube 138 is configured to draw fluid out of liner 180. The fluid is drawn through intake flow tube 138 and is routed downstream to pump 60 through supply tube 72. Valve 184 is configured to prevent backflow out of fluid port 96. Valve 184 also allows a supply of fluid, such as an external supply connected to reservoir 34 by a tether, to provide fluid to reservoir 34 and/or pump 60 through fluid port 96. Valve 184 is a one-way valve configured to allow fluid to flow into fluid port 96 and to supply tube 72. Valve 184 can be any suitable one-way valve for preventing flow out of fluid port 96 from reservoir 34, such as a needle valve, a ball valve, or any other desired one-way valve.

Prior to operation, liner 180 is primed to ensure an airless fluid supply. Liner 180 is filled with fluid and is secured between lid 178 and base 176. Valve 184 is opened by the user, such as by pressing down on valve 184. With valve 184 open, the user squeezes liner 180, through windows 188 in base 176, for example, and drives the air out of liner 180 through valve 184. When the air has been evacuated from liner 180, the user releases valve 184 and valve shifts back to the closed position. With valve 184 in the closed position air cannot flow back into liner 180. Reservoir 34 is thus primed for spraying. While reservoir 34 is described as having air evacuated through valve 184, it is understood that lid 178 can also include a valve through which air can be evacuated from liner 180.

During spraying, fluid is withdrawn from liner 180, causing liner 180 to shrink and crumple within base 176. Shrinking liner 180 in response to the fluid being withdrawn prevents sloshing of the fluid within reservoir 34, thereby preventing unexpected and unintended shifting of the center of mass, which can destabilize UAV 12. Liner 180 also ensures a consistent feed of fluid despite movement of UAV 12 during flight. While reservoir 34 is described as including intake flow tube 138, it is understood that intake flow tube 138 can be omitted from examples that include liner 180, as liner 180 collapses upwards towards fluid port 96 as fluid is withdrawn. Liner 180 collapses upwards towards lid 178 during flight because the pressure within liner 180 is less than the pressure outside of liner 180, due to the suction from pump 60.

Reservoir 34 provides significant advantages. Liner 180 collapses as fluid is withdrawn, ensuring an airless supply of the fluid. Liner 180 further prevents sloshing and ensures that the center of mass of UAV 12 remains steady. Liner 180 thus prevents unpredictably changes in the center of mass and the resultant instability. Reservoir 34 provides improved stabilization and control to UAV 12. In addition, valve 184 allows UAV 12 to be connected to an outside fluid source, minimizing the load that UAV 12 must support during spray operations.

FIG. 7A is a side elevation view of fan rotating assembly 190 with nozzle 38 in a horizontal fan orientation. FIG. 7B is a side elevation view of fan rotating assembly 190 with nozzle 38 in a vertical fan orientation. FIG. 7C is a perspective view of nozzle 38 applying a spray fan while in the vertical fan orientation. FIG. 7D is a perspective view of nozzle 38 in an intermediate orientation. FIG. 7E is a perspective view of nozzle 38 applying a spray fan while in the horizontal fan orientation. FIGS. 7A-7E will be discussed together.

Fan rotating assembly 190 includes sleeve 192 and nozzle rotator 194. Sleeve 192 includes teeth 196. Nozzle rotator 194 includes rotation motor 198 and pinion 200. Teeth 196 extend at least partially around sleeve 192. In some examples, teeth extend 90° around sleeve 192. Nozzle rotator 194 is configured to rotate sleeve 192, and thus nozzle 38, between the horizontal fan orientation and the vertical fan orientation. Rotation motor 198 is mounted on spray tube 74 and can be any suitable motor for driving the rotation of sleeve 192, such as a stepper motor. Pinion 200 extends from rotation motor 198 and interfaces with teeth 196 on sleeve 192. Rotation motor 198 is connected to a power source, such as power source 42 (FIG. 1), by wire 202.

Nozzle 38 is fluidly connected to spray tube 74 and is configured to receive fluid from spray tube 74. Sleeve 192 connects nozzle 38 to spray tube 74. Nozzle 38 is attached to sleeve 192, and sleeve 192 is attached to spray tube 74. A rotatable, sealed joint is disposed at the interface of sleeve 192 and spray tube 74, such that sleeve 192 can rotate relative to spray tube 74.

During operation, UAV 12 can apply fluid using both horizontal spray fans and vertical spray fans. The orientation of a spray fan is based on an orientation of the elongate sides of the spray fan. As shown in FIG. 7C, UAV 12 applies vertical spray fans, when UAV 12 moves laterally relative to the surface. As shown in FIG. 7E, UAV 12 applies horizontal spray fans when UAV 12 moves vertically relative to the surface. As such, the spray fan is oriented orthogonal to the direction of travel of UAV 12.

A spray event where UAV 12 paints a corner will be discussed as an example. Nozzle 38 is initially in the vertical spray orientation (FIGS. 7B and 7C). The fluid is driven to nozzle 38 under pressure, and nozzle 38 generates the vertical spray fan. UAV 12 travels horizontally along the surface to apply the horizontal stripe. When UAV 12 reaches the end of horizontal stripe H, nozzle 38 must be reoriented to the horizontal spray orientation (FIGS. 7A and 7E) to apply the vertical stripe V. Nozzle rotator 194 is activated by providing power to rotation motor 198 via wire 202. Rotation motor 198 drives pinion 134, and pinion 134 in turn causes sleeve 192 to rotate relative to spray tube 74 due to pinion 134 interfacing with teeth 196. As shown in FIG. 7D, sleeve 192 and nozzle 38 rotate relative to spray tube 74, and nozzle 38 transitions from the vertical spray orientation to the horizontal spray orientation. With nozzle 38 in the horizontal fan orientation, sprayer 36 is reactivated, and UAV 12 moves vertically relative to the surface and applies the vertical stripe.

Fan rotating assembly 190 provides significant advantages. Fan rotating assembly 190 allows UAV 12 to automatically change the fan orientation mid-flight. As such, UAV 12 can apply both vertical stripe V and horizontal stripe H without requiring the user to change spray tips. In addition, UAV 12 is able to paint corners by utilizing both the horizontal fan orientation and the vertical fan orientation. Fan rotating assembly 190 ensures that the spray fan can be oriented orthogonal to the direction of travel of UAV 12, regardless of that direction of travel.

FIG. 8A is an isometric view of propeller cover 204. FIG. 8B is a cross-sectional view of propeller cover 204 taken along line 8-8 in FIG. 8A. FIGS. 8A and 8B will be discussed together. Propeller cover 204 includes cover body 206, support arms 208*a*-208*b*, and braces 210*a*-210*b*. Cover body 206 includes side wall 212, serpentine passage 214, and intake duct 216. Arm 76, lift rotor 78, and sensor 26 of UAV 12 (FIGS. 2A-2C) are shown. Lift rotor 78 includes lift motor 98 and lift propeller 100

Arm 76 extends from cover body 206 (shown in FIGS. 2A-2C) of UAV 12 (shown in FIGS. 2A-2C). Lift rotor 78 is mounted at a distal end of arm 76 and provides lift to UAV 12. Lift motor 98 is mounted on arm 76, and lift propeller 100 is mounted on and driven by lift motor 98. Sensor 26 is disposed on lift motor 98. Sensor cover 218 extends about lift motor 98 and encloses sensor 26.

Brace 210*a* is mounted on arm 76. Brace 210*a* can be mounted on arm 76 in any suitable manner. For example, brace 210*a* can be a sleeve that can slide onto arm 76 or brace 210*a* can be clamped onto arm 76. Support arm 76*a* extends from brace 210*a* and supports cover body 206 relative to arm 76 and lift rotor 78. Brace 210*b* is mounted on lift motor 98. Brace 210b can be mounted on lift motor 98 in any suitable manner. For example, brace 210b can slide onto arm 76, can be clamped onto arm 76, or can be permanently affixed to arm. Support arm 76b extends from brace 210a and to side wall 212. Support arm 76b supports cover body 206 relative to arm 76 and lift rotor 78. In some examples, propeller cover 204 includes a single support arm 76 extending from brace 210. In other examples, propeller cover 204 includes multiple support arms 208 to support cover body 206 relative to lift rotor 78. Propeller cover 204 can include any desired number of support arms 208 to support cover body 206 relative to arm 76 and lift rotor 78.

Cover body 206 surrounds lift propeller 100 and is configured to shield lift rotor 78 during spraying. Serpentine passage 214 extends through cover body 206 and is configured to route air to lift rotor 78. Inlet intake duct 216 opens through cover body 206 and into serpentine passage 214 to allow lift rotor 78 to draw air into cover body 206 and through serpentine passage 214. Side wall 212 extends below lift propeller 100. As shown, side wall 212 is cylindrical, but it is understood that side wall 212 can be of any desired configuration for protecting lift rotor 78, such as an oval, triangle, square, or pentagon, among others.

As UAV 12 applies the spray fan to a surface some of the atomized spray bounces off of the surface instead of adhering to the surface. The atomized spray that rebounds from the surface is considered overspray. Overspray can be sucked in by lift propellers 100, which can accelerate the overspray and drive the overspray onto an undesired surface. In addition, the overspray can land and dry on lift rotor 78, which can cause imbalance of lift rotor 78. Propeller cover 204 provides overspray mitigation to prevent overspray from being blown onto undesired surfaces, from unbalancing lift propeller 100, and/or from obscuring sensor 26.

Propeller cover 204 encloses lift rotor 78. Lift propeller 100 is disposed below serpentine passage 214. To generate lift, lift propeller 100 draws the air into serpentine passage 214 through inlet intake duct 216. The air travels through serpentine passage 214 and to lift propeller 100, and lift propeller 100 drives the air out of propeller cover 204 to generate thrust. Serpentine passage 214 includes narrow channels that speed up air flow as the air travels through serpentine passage 214. Any atomized fluid entrained in the air is drawn into serpentine passage 214 through inlet intake duct 216. However, the atomized fluid is heavier than air, such that the fluid cannot round the bends in serpentine passage 214. Instead, the atomized fluid sticks to the walls defining serpentine passage 214, preventing the fluid from reaching lift rotor 78. Side wall 212 extends below lift propeller 100, which further prevents overspray from being sucked into lift propeller 100. Propeller cover 204 thus prevents the atomized fluid from reaching lift rotor 78 and arm 76.

Sensor cover 218 extends around sensor 26 and prevents overspray from adhering to sensor 26. In some examples, sensor cover 218 can be placed over sensor 26 before operation and can be removed after operation. For example, sensor cover 218 can be a cellophane cling wrap that can be removed after operation.

Propeller cover 204 provides significant advantages. Propeller cover 204 prevents overspray from reaching lift rotor 78, which prevents the overspray from being accelerated onto an undesired surface by lift propeller 100 and from adhering to lift propeller 100. As such, propeller cover 204 prevents overspray from being driven onto undesired surfaces and prevents overspray from causing imbalance of lift rotor 78. Sensor cover 218 provides a simple, easy-to-use protective device for sensor 26. Sensor cover 218 provides protection to sensor 26 even when overspray does reach sensor 26. Any overspray that reaches sensor 26 adheres to sensor cover 218, and sensor cover 218 can be removed at the end of a flight, removing the overspray.

Figure 9:
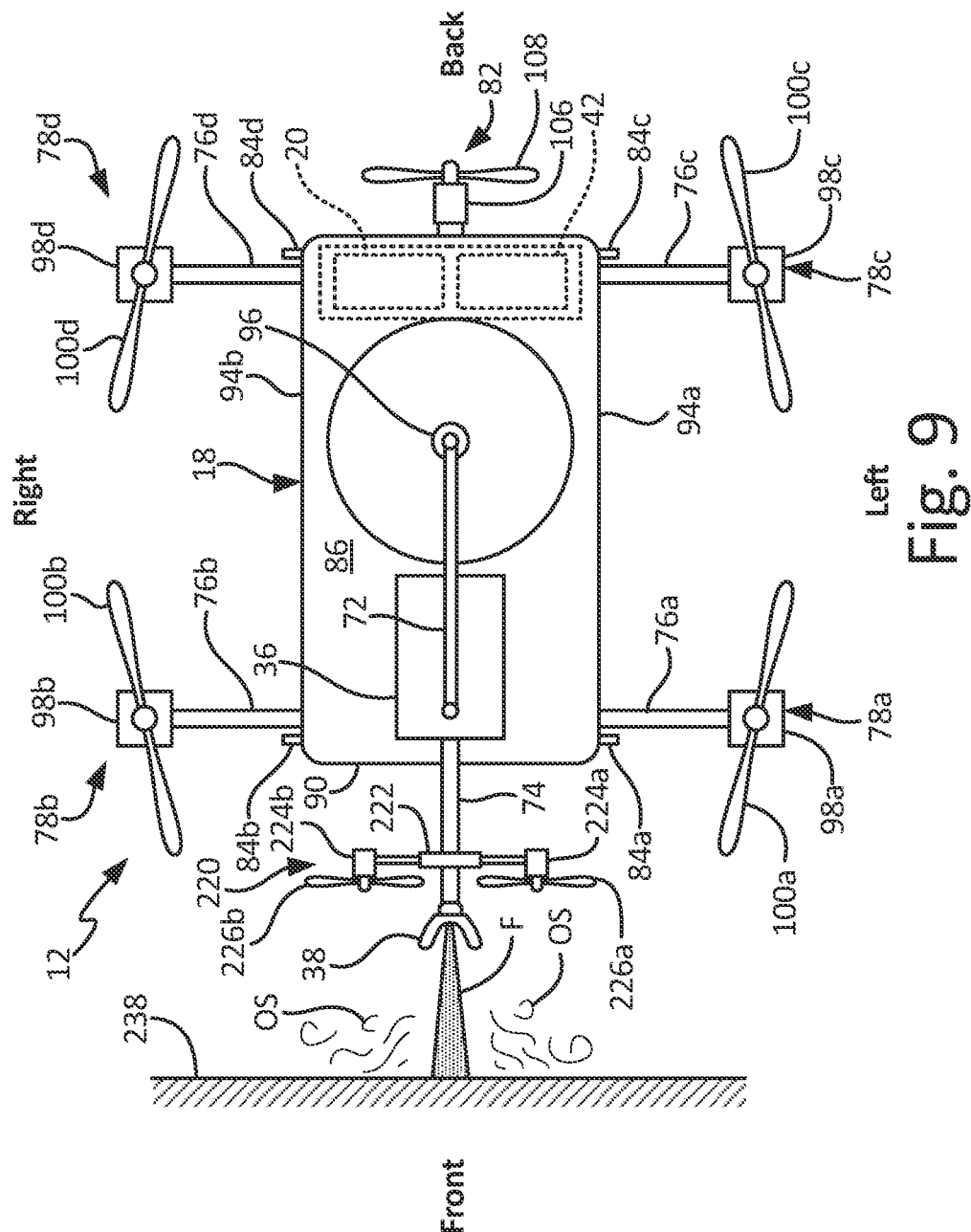
FIG. 9 is a plan view of an unmanned aerial vehicle.

FIG. 9 is a plan view of UAV 12 and overspray mitigation device 220. Body 18, control unit 20, reservoir 34, sprayer 36, power source 42, supply tube 72, spray tube 74, nozzle 38, arms 76a-76d, lift rotors 78a-78d, rear rotor 82, and landing struts 84a-84d of UAV 12 are shown. Top 86, front 90, rear 92, first lateral side 94a, and second lateral side 94b of body 18 are shown. Reservoir 34 includes fluid port 96. Lift rotors 78a-78d include lift motors 98a-98d and lift propellers 100a-100d, respectively. Rear rotor 82 includes rear motor 106 and rear propeller 108. Overspray mitigation device 220 includes mount 222, mitigation motors 224a-224b and mitigation propellers 226a-226b.

Body 18 of UAV 12 supports the onboard components of UAV 12. Power source 42 is mounted on body 18 and can provide power to all components of UAV 12. Control unit 20 is supported by body 18 and configured to control flight of UAV 12, spraying by sensor 26, and overspray mitigation by overspray mitigation device 220. Arms 76 extend from body 18 and support lift rotors 78. Lift motors 98 are disposed at the distal ends of arms 76, and lift propellers 100 are mounted on and driven by lift motors 98. Rear rotor 82 is disposed on rear 92 of body 18. Rear motor 106 extends from rear 92 and rear propeller 108 is mounted on and driven by rear motor 106. Landing struts 84 extend from body 18 and support body 18 of UAV 12.

Reservoir 34 is disposed on body 18. In some examples, reservoir 34 can be integral with and defined by body 18. Sprayer 36 is disposed on body 18, and is configured to draw fluid out of reservoir 34 and drive the fluid downstream to nozzle 38. Supply tube 72 extends between reservoir 34 and sprayer 36 and provides a flowpath for fluid to flow to sprayer 36 from reservoir 34. Supply tube 72 can be connected to fluid port 96 of reservoir 34. Spray tube 74 extends from sprayer 36 and is configured to route the fluid downstream from sprayer 36 to nozzle 38. Nozzle 38 is disposed at the end of spray tube 74 opposite sprayer 36.

Overspray mitigation device 220 is disposed on spray tube 74 proximate nozzle 38. Mount 222 is attached to spray tube 74. Mitigation motors 224a-224b extend from mount and are configured to rotationally drive mitigation propellers 226a-226b, respectively. Mitigation propellers 226 are oriented to drive air forward, towards surface 238. Mitigation propellers 226 are spaced from spray fan F and oriented to drive air forward, parallel to and offset from elongate side of spray fan F. For example, mitigation propellers 226 are spaced horizontally from spray fan F where spray fan is in the vertical fan orientation (shown in FIG. 7C), and mitigation propellers 226 are spaced vertically from spray fan F where spray fan F is in the horizontal fan orientation (shown in FIG. 7E). As such, mitigation propellers 226 are located on the elongate sides of spray fan F. In some examples, overspray mitigation device 220 can be mounted on a fan rotating assembly, such as fan rotating assembly 190 (best seen in FIGS. 7A-7B), such that overspray mitigation device 220 can rotate with nozzle 38. In this way, mitigation propellers 226 are always oriented to drive the air forward, parallel to and offset from spray fan F regardless of whether spray fan F is in the horizontal fan orientation or the vertical fan orientation.

During operation, sprayer 36 draws fluid from reservoir 34, pressurizes the fluid, and drives the fluid downstream through spray tube 74 and to nozzle 38. Nozzle 38 atomizes the fluid and generates spray fan F. Spray fan F impinges on surface 238 and some of the fluid particles rebound from the surface and create overspray OS. To counteract overspray OS, control unit 20 activates mitigation motors 224. Mitigation motors 224 drive mitigation propellers 226, and mitigation propellers 226 generate a forward airflow to drive overspray OS towards surface 238. Driving overspray OS towards surface 238 provides additional opportunity for the spray droplets to adhere to surface 238. In addition, driving overspray OS towards surface 238 prevents overspray OS from landing on other surfaces or objects, such as UAV 12, where the droplets are not desired. In some examples, activation of overspray mitigation device 220 is linked to activation of sprayer 36. For example, control unit 20 activates overspray mitigation device 220 whenever sprayer 36 is activated, such that mitigation propellers 226 generate the forward airflow whenever nozzle 38 is producing spray fan. Linking the activation of overspray mitigation device 220 to the activation of sprayer 36 also prevents overspray mitigation device 220 from generating unwanted rearward thrust.

As discussed above, rear rotor 82 provides counter-propulsion to counteract and balance the spray forces generated at nozzle 38. In addition to the rearward forces generated by spraying through nozzle 38, overspray mitigation device 220 generates additional thrust that drives UAV 12 away from surface 238. Rear rotor 82 is configured to counteract the forces generated both by the spray through nozzle 38 and by overspray mitigation device 220. Rear motor 106 can be configured to activate at the same time as mitigation motors 224 to counteract the thrust generated by mitigation motors 224. In addition, rear rotor 82 can be configured to generate variable thrust to counteract only the force generated by nozzle 38, only the force generated by overspray mitigation device 220, or the combined force. Operation of rear motor 106 can further be tied to overspray mitigation device 220 such that rear motor 106 stops at the same time as, or within a close time period of, mitigation motors 224. As such, operation of rear rotor 82 and overspray mitigation device 220 can be synchronized.

Overspray mitigation device 220 provides significant advantages. Overspray propellers 56 drive overspray OS away from UAV 12 and back towards surface 238. As such, overspray OS is prevented from adhering to an undesired surface while having additional opportunities to adhere to surface 238. Moreover, overspray mitigation device 220 is oriented to drive air parallel to and offset from the elongate edges of spray fan F, such that overspray mitigation device 220 does not have an adverse impact on the integrity of spray fan F. In addition, mounting overspray mitigation device 220 on sleeve 192 allows overspray mitigation device 220 to rotate with nozzle 38, ensuring that mitigation propellers 226 are disposed on the elongate sides of spray fan F regardless of the orientation of nozzle 38.

Figure 10:
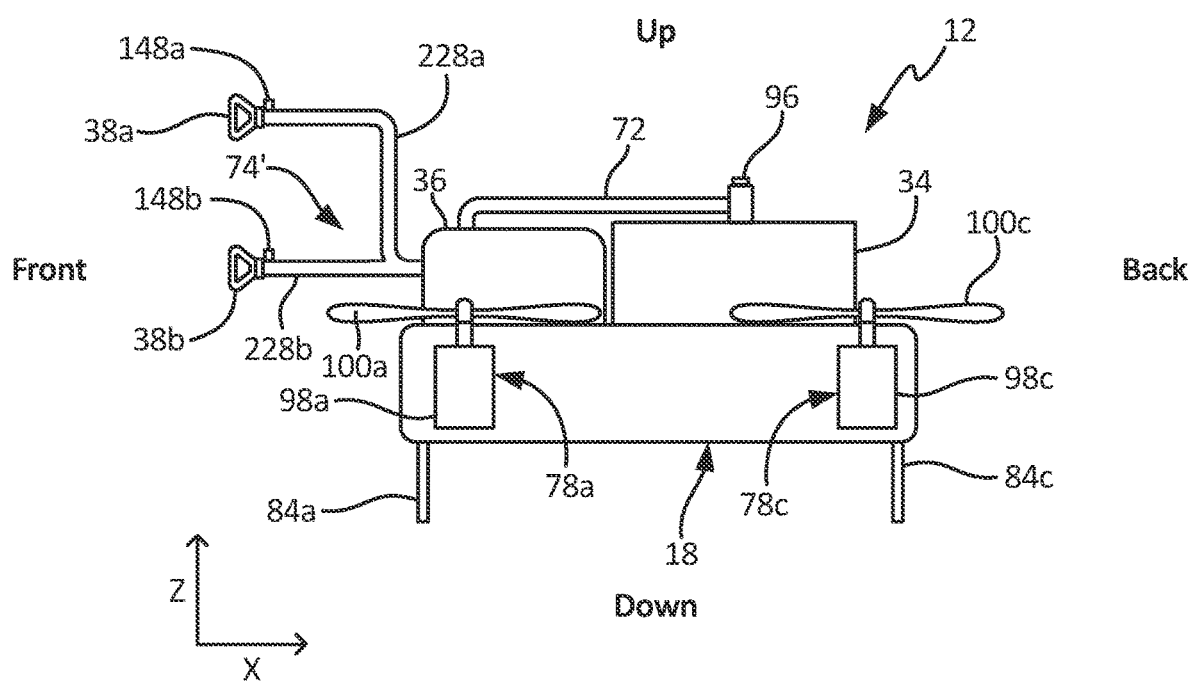
FIG. 10 is a side elevation view of an unmanned aerial vehicle.

FIG. 10 is a side elevation view of UAV 12. Body 18, reservoir 34, sprayer 36, supply tube 72, spray tube 74', nozzles 38a-38b, lift rotors 78a and 78c, and landing struts 84a and 84c of UAV 12 are shown. Reservoir 34 includes fluid port 96. Lift rotor 78a includes lift motor 98a and lift propeller 100a, and lift rotor 78c includes lift motor 98c and lift propeller 100c. Spray tube 74' includes first branch 228a and second branch 228b. First branch 228a includes valve controller 148a, and second branch 228b includes valve controller 148b.

Body 18 of UAV 12 supports the on-board components of UAV 12. Lift rotors 78 provide lift during flight. Lift motors 98 provide rotational power to lift propellers 100. Landing struts 84 support UAV 12 on the ground. Reservoir 34 is disposed on body 18. In some examples, reservoir 34 can be integral with and defined by body 18. Sprayer 36 is disposed on body 18, and is configured to draw fluid out of reservoir 34 and drive the fluid downstream to nozzle 38. Supply tube 72 extends between reservoir 34 and sprayer 36 and provides a flowpath for fluid to flow to sprayer 36 from reservoir 34.

Spray tube 74' extends from sprayer 36 and is configured to route the fluid downstream from sprayer 36. Nozzle 38a is fluidly connected to first branch 228a of spray tube 74, and nozzle 38b is fluidly connected to second branch 228b of spray tube 74. In some examples, first branch 228a and second branch 228b are formed from separate spray tubes and extend individually from sprayer 36. In other examples, first branch 228a and second branch 228b extend from a common intersection point on spray tube 74' downstream of the connection with sprayer 36.

Nozzle 38a and nozzle 38b are aligned along an axis, such as the vertical axis in an over/under configuration or the lateral axis in a side-by-side configuration. In some examples, nozzle 38a is spaced from nozzle 38b such that the respective spray fans meet at their ends or overlap by a desired amount. As such, nozzles 38a-38b allow UAV 12 to apply a much wider stripe of fluid than a single nozzle. In some examples, nozzle 38a is configured differently than nozzle 38b. For example, one of nozzles 38a-38b is oriented to generate a horizontal spray fan and the other of nozzles 38a-38b is oriented to generate a vertical spray fan. In another example, nozzle 38a includes an orifice having a different size, shape, and/or orientation than the orifice of nozzle 38b.

Valve controller 148a and valve controller 148b allow for spray through nozzle 38a and through nozzle 38b to be individually controlled. Valve controllers 142a-142b are electrically actuated based on a command from a control unit, such as control unit 20 (best seen in FIG. 1). In some examples, valve controller 148a interacts with a check valve, such as tip valve 118 (shown in FIGS. 5A-5B), disposed within first branch 228a and that controls the flow of fluid to nozzle 38a. Valve controller 148a can control the check valve between open and closed and can be configured to hold the check valve in the closed position until spraying is desired. Valve controller 148a can also drive the check valve from the open position to the closed position when an immediate cessation of spraying is desired. Similarly, valve controller 148b interacts with a check valve, such as tip valve 118, disposed within second branch 228b that controls the flow of fluid out of nozzle 38b. Valve controller 148b can control the check valve between open and closed and can be configured to hold the check valve in the closed position until spraying is desired. Valve controller 148b can also drive the check valve from the open position to the closed position when an immediate cessation of spraying is desired. As such, fluid can be selectively applied through nozzle 38a, nozzle 38b, or both.

UAV 12 provides significant advantages. Nozzles 38a and 38b can have different orientations and can include orifices of different shapes and sizes. As such, nozzles 38a and 38b allow a single UAV 12 to apply different types of spray patterns. In addition, nozzles 38a and 38b allow UAV 12 to apply wider stripes as compared to a single nozzle. Valve controller 148a and valve controller 148b allow for nozzle 38a and nozzle 38b to be individually controlled and activated, such that spray is applied though only the desired one of nozzle 38a and nozzle 38b.

Figure 11:
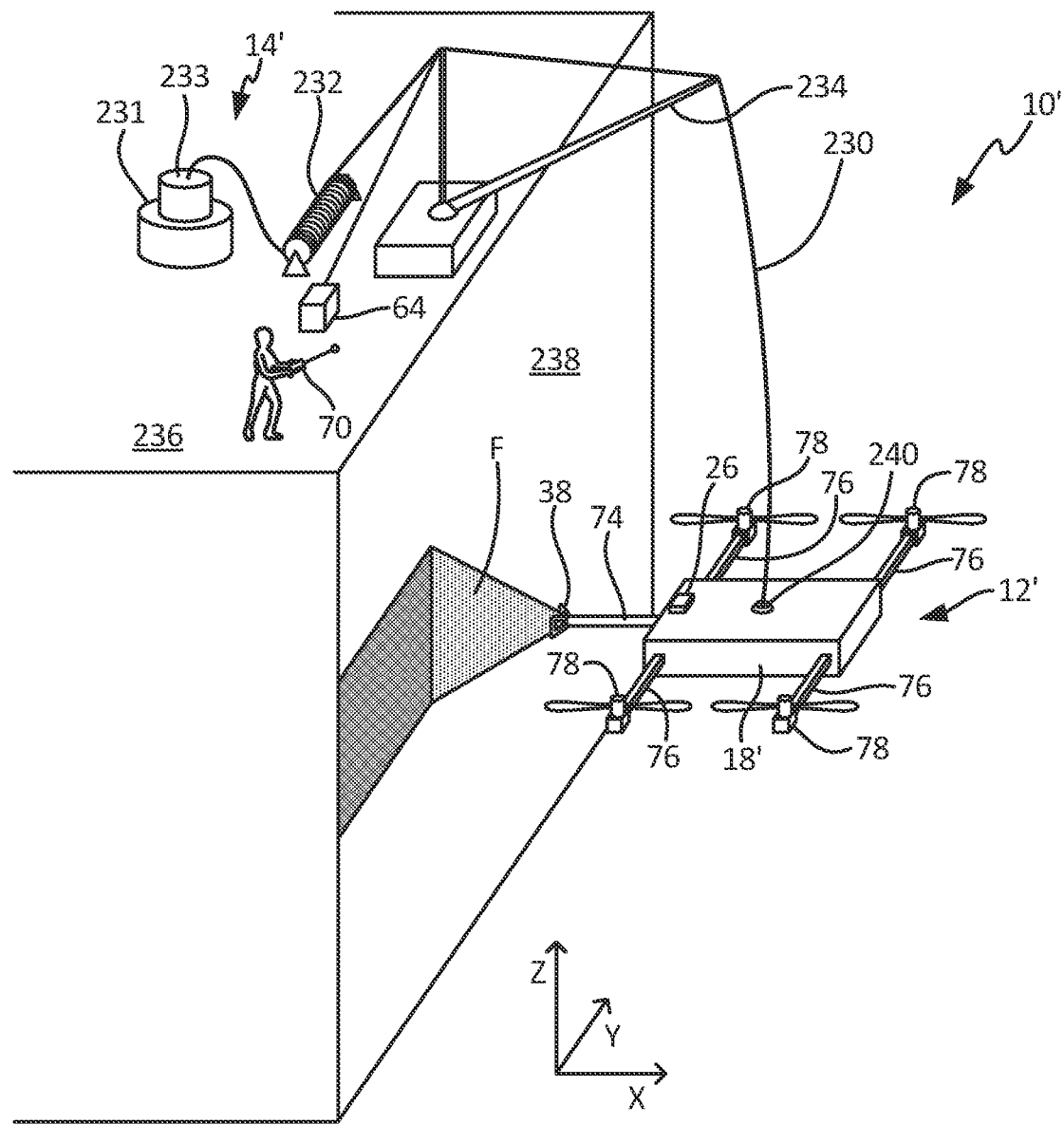
FIG. 11 is a cross-sectional view of an unmanned aerial vehicle.

FIG. 11 is a simplified schematic perspective view of UAV spray system 10'. UAV spray system 10' includes UAV 12', off-board components 14', and tether 230. Body 18', sensors 26, nozzle 38, spray tube 74, lift rotors 78, and fluid port 240 of UAV 12' are shown. UAV 12' is simplified, but it is understood that UAV 12' can include any of the components described herein. Off-board components 14' include off-board control unit 64, user interface 70, off-board reservoir 231, spindle 232, off-board pump 233, and boom 234.

Off-board components 14 are disposed on top of building 236, which includes surface 238 to which the fluid is to be applied. Boom 234 is disposed on top of building 236 and extends the drop of tether 230 away from building 236. Tether 230 is wrapped around spindle 232, extends to boom 234, and extends from boom 234 to UAV 12. Spindle 232 is rotatable to deploy and retract tether 230. Off-board reservoir 231 stores a volume of fluid, and off-board pump 233 draws the fluid out of off-board reservoir 231 and drives the fluid to UAV 12. Off-board pump 233 can be any suitable pump for driving fluid to UAV 12 from off-board reservoir 231. For example, off-board pump 233 can be a piston pump, a diaphragm pump, a peristaltic pump, or any other suitable pump. Tether 230 extends to UAV 12 and is configured to provide the fluid to UAV 12. In some examples, tether 230 includes a power cord to provide power to components of UAV 12.

Fluid port 240 is disposed on UAV 12 and receives tether 230. Lift rotors 78 are supported by body 18' of UAV 12, and lift rotors 78 provide lift to UAV 12 during flight. Spray tube 74 extends from body 18', and nozzle 38 is disposed at an end of spray tube 74. Nozzle 38 is configured to generate a spray fan of the fluid. Sensor 26 is disposed on UAV 12 and is configured to provide information regarding the one or more of the location, acceleration, and orientation of UAV 12. For example, sensor 26 can include a location sensor, such as location sensor 50 (FIG. 1), an inertial sensor, such as inertial sensor 52 (FIG. 1), and/or an optical sensor, such as optical sensor 48 (FIG. 1).

In some examples, fluid port 240 is disposed on vertical axis Z-Z extending through a center of gravity of UAV 12. Locating fluid port 240 at the center of gravity of UAV 12 ensures that the fluid supplied to or stored within UAV 12 remains aligned with the center of gravity of UAV 12 throughout operation. In this way, any change in fluid level does not affect the balance and stability of UAV 12. Connecting tether 230 to fluid port 240 disposed at the top of UAV 12 lessens the load on UAV 12, as UAV 12 does not have to support the full weight of tether 230.

Boom 234 can be positioned at any desired location where UAV 12 is operating below boom 234. Off-board control unit 64 is connected to boom 234 and can control boom motors to cause boom 234 to articulate and rotate to maintain the end of boom 234 over or close to UAV 12. Tether 230 is wrapped around spindle 232 such that spindle 232 can rotate to retract or deploy tether 230. Spindle 232 is controlled to ensure that there is sufficient slack in tether 230 to allow UAV 12 free movement, but not too much slack such that tether 230 increases the load on UAV 12 or drapes on UAV 12. In some examples, tether 230 can include a strain gauge to measure slack and provide feedback to off-board control unit 64. Off-board control unit 64 controls spindle 232 based on the feedback from the strain gauge to thereby control the deployed length of tether 230 based on the slack detected. In some examples, off-board control unit 64 can control spindle 232 based on a sensed distance between the end of the boom 234 and UAV 12. For example, sensor 26 can include a location sensor, such as a GPS receiver chip, and off-board control unit 64 can calculate the distance from UAV 12 to boom 234 based on the information received from sensor 26. In some examples, off-board control unit 64 includes a power source configured to provide power to UAV 12 and to off-board components 14. Off-board control unit 64 can communicate with UAV 12, control boom 234, control pump 60, and control spindle 232 in any desired manner. For example, off-board control unit 64 can communicate via wired and/or wireless communications, such as serial communications (e.g., RS-232, RS-485, or other serial communications), digital communications (e.g., Ethernet), WiFi communications, cellular communications, or other wired and/or wireless communications. The user can communicate with and control off-board control unit 64 and UAV 12 via user interface 70.

During operation, off-board pump 233 draws fluid out of off-board reservoir 231 and drives the fluid downstream through tether 230 and to UAV 12. The fluid is driven through spray tube 74 to nozzle 38, and nozzle 38 atomizes the spray and generates spray fan F for application to surface 238. In some examples, off-board pump 233 is a high pressure pump configured to drive the fluid to UAV 12 and to provide sufficient pressure to cause nozzle 38 to atomize the fluid. In other examples, UAV spray system 10 includes a pump onboard UAV 12, such as pump 60 (best seen in FIGS. 3A-3B) and pump 60' (shown in FIG. 4), in addition to off-board pump 233. In one example, off-board pump 233 is configured to pump the fluid at relatively low pressures (about 1-50 psi), while the onboard pump is configured to pump the fluid at relatively high pressures (about 500-4000 psi) that are required to atomize the fluid. Locating off-board pump 233 and off-board reservoir 231 above UAV 12 reduces the pressure required to pump the fluid to UAV 12 via tether 230, thereby reducing the pressure requirements at off-board pump 233.

The two pump system provides a significant, and nearly unlimited, fluid supply and power supply to UAV 12 while maintaining the maneuverability of UAV 12. For example, off-board control unit 64 can be plugged into an outlet or a generator, and power from the outlet or generator can be provided to UAV 12 via an electrical cord on tether 230. In addition, off-board reservoir 231 is not confined by the carrying capacity of UAV 12, and as such off-board reservoir 231 can be of any desired size and configuration. Off-board reservoir 231 thus provides a bulk supply of fluid to UAV 12 throughout spraying. Pump 60 being a low-pressure pump allows tether 230 to include a lightweight and flexible hose to supply fluid to UAV 12. Where tether 230 transports fluid at low pressures, tether 230 does not require additional reinforcement, such as wire winding or braiding, that stiffens and adds weight to the hose. Moreover, the low fluid pressures allow the hose to flex even when carrying fluids under pressure, whereas high pressure hoses typically stiffen when subjected to high pressure fluids. As such, the hose does not adversely impact the maneuverability of UAV 12.

UAV spray system 10 provides significant advantages. Off-board reservoir 231 and off-board pump 233 are located remotely from UAV 12 such that a large supply of fluid can be connected to UAV 12. In addition, off-board pump 233 and off-board reservoir 231 are located above UAV 12 such that pump 60 can drive fluid to UAV 12 under low pressure, as the force of gravity assists the flow to UAV 12. Spindle 232 deploys and retracts tether 230 to ensure that a desired length of tether 230 is deployed at any given time. Moreover, boom 234 is controlled such that the end of boom 234 is located over or near UAV 12, thereby minimizing the length of tether 230 to UAV 12 and reducing strain on UAV 12 caused by tether 230.

Figure 12:
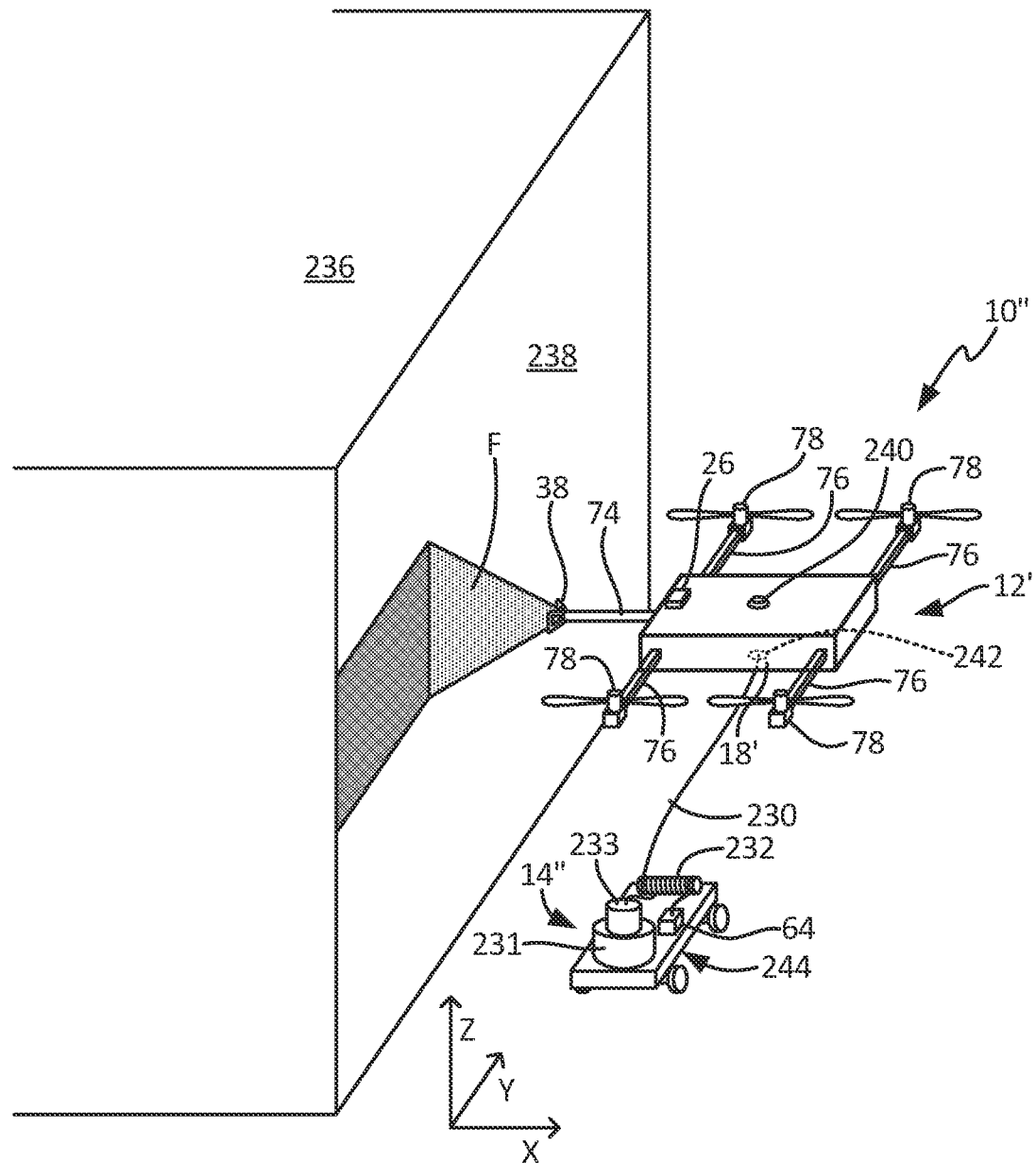
FIG. 12 is a schematic perspective view of a UAV painting system.

FIG. 12 is a simplified schematic perspective view of UAV spray system 10". UAV spray system 10" includes UAV 12', off-board components 14", and tether 230. Body 18', sensors 26, nozzle 38, spray tube 74, lift rotors 78, upper fluid port 240, and lower fluid port 242 of UAV 12' are shown. UAV 12' is simplified, but it is understood that UAV 12' can include any of the components described herein. Off-board components 14 include off-board reservoir 231, off-board pump 233, off-board control unit 64, spindle 232, and ground vehicle 244.

Ground vehicle 244 is a motive vehicle and can be guided by off-board control unit 64 to follow below UAV 12. Ground vehicle 244 can include wheels, tracks, or any other suitable form of locomotion. While ground vehicle 244 is described as a terrestrial vehicle, it is understood that ground vehicle 244 can, in some examples, be a water craft. Ground vehicle 244 can be electrically powered, gas powered, or powered in any other suitable manner. While ground vehicle 244 is described as autonomously controlled by off-board control unit 64, it is understood that ground vehicle can be manually controlled or remotely controlled by a user. For example, the user can control the movement of ground vehicle via a user interface, such as user interface 70 (FIG. 1).

Off-board reservoir 231 is disposed on ground vehicle 244 and is configured to store a volume of fluid for application by UAV 12. Pump 60 is mounted on off-board reservoir 231 and is configured to draw fluid from off-board reservoir 231 and to drive the fluid to UAV 12. Off-board pump 233 can be any suitable pump for driving fluid to UAV 12 from off-board reservoir 231. For example, off-board pump 233 can be a piston pump, a diaphragm pump, a peristaltic pump, or any other suitable pump. Spindle 232 is disposed on ground vehicle 244 and is configured to deploy and retract tether 230 during operation. Off-board control unit 64 is disposed on ground vehicle and can control one or more of pump 60, spindle 232, ground vehicle 244, and UAV 12.

Body 18' supports the onboard components of UAV 12. Lift rotors 78 extends from body 18' and are configured to generate lift to UAV 12 during flight. Spray tube 74 extends from body 18', and nozzle 38 is disposed at an end of spray tube 74. Nozzle 38 is configured to generate a spray fan of the fluid. Sensor 26 is disposed on UAV 12 and is configured to provide information regarding the one or more of the location, acceleration, and orientation of UAV 12. For example, sensor 26 can include a location sensor, such as location sensor 50 (FIG. 1), an inertial sensor, such as inertial sensor 52 (FIG. 1), and/or an optical sensor, such as optical sensor 48 (FIG. 1).

Lower fluid port 242 and upper fluid port 240 extend through body 18' of UAV 12. Tether 230 extends from ground vehicle 244 to UAV 12 and is attached to UAV 12 at lower fluid port 242. In some examples, tether 230 can include a fluid supply hose and power cable, among other options, and tether 230 is configured to provide fluid and/or power to UAV 12. In some examples, lower fluid port 242 is aligned on vertical axis Z-Z extending through a center of gravity of UAV 12. Aligning lower fluid port 242 on vertical axis Z-Z ensures that the fluid pumped to UAV 12 and supplied through lower fluid port 242 is aligned at the center of gravity of UAV 12 such that the fluid does not change the center of gravity during operation. In some examples, lower fluid port 242 and upper fluid port 240 are both aligned on vertical axis Z-Z.

During operation, off-board pump 233 draws the fluid out of off-board reservoir 231 and drives the fluid to UAV 12 for application on surface 238. In some examples, off-board pump 233 generates sufficient pressure to drive the fluid to UAV 12 but not to pressurize the fluid for application by nozzle 38. As such, UAV 12 can include an onboard pump, such as pump 60 (best seen in FIGS. 3A-3B) or pump 60' (shown FIG. 4), to provide sufficient pressurization to atomize the fluid at nozzle 38. In some examples, off-board pump 233 is dynamically controlled based on the location of UAV 12 and/or the length of tether 230 deployed. For example, off-board pump 233 is configured to generate higher pressures as the altitude of UAV 12 increases and the length of tether 230 increases, and off-board pump 233 is similarly configured to generate lower pressures as the altitude of UAV 12 decreases and the length of tether 230 decreases. In one example, off-board control unit 64 receives feedback from a sensor, such as an encoder on spindle 232, indicative of the length of tether 230 deployed, and off-board control unit 64 controls the fluid pressure generated based on the feedback from the sensor.

Ground vehicle 244 is configured to be located directly underneath or nearly underneath UAV 12 to minimize the length of tether 230 that UAV 12 needs to support. The length of tether 230 is preferably sufficiently long such that tether 230 does not pull on UAV 12, but sufficiently short such that tether 230 does not drape on ground vehicle 244. Ground vehicle 244 can be autonomously driven and linked to UAV 12. For example, UAV 12 and ground vehicle 244 can each include a GPS receiver chip to provide the location of UAV 12 and ground vehicle 244. Off-board control unit 64 can compare the GPS information for UAV 12 and ground vehicle 244 and can command ground vehicle 244 to change locations based on UAV 12 location. As such, the location of UAV 12 can determine the location of ground vehicle 244. In some examples, UAV 12 applies fluid according to a pre-programmed flight plan. Both UAV 12 and ground vehicle 244 can include the pre-programmed flight plan, such that ground vehicle 244 automatically follows along beneath UAV 12 as UAV 12 follows the flight plan. In another example, the user can control ground vehicle 244, UAV 12, or both via a user interface.

UAV spray system 10' provides significant advantages. Off-board reservoir 231 holds a bulk supply of fluid that is not limited by the flight capacity of UAV 12. As such, off-board reservoir 231 minimizes the need for refills, thereby increasing the speed and efficiency of the spray process. Ground vehicle 244 automatically follows UAV 12 to minimize the length of tether 230 extending to UAV 12. Minimizing the length of tether 230 reduces the load carried by UAV 12 and the force required to drive the fluid to UAV 12 along tether 230, thereby reducing the size and power requirements of off-board pump 233. Moreover, UAV spray system 10 provides a fully autonomous spraying system with a bulk fluid supply. UAV 12 and ground vehicle 244 are both configured to execute an autonomous spraying regimen. Ground vehicle 244 can automatically follow below UAV 12 as UAV 12 follows a pre-programmed flight plan.

Figure 13:
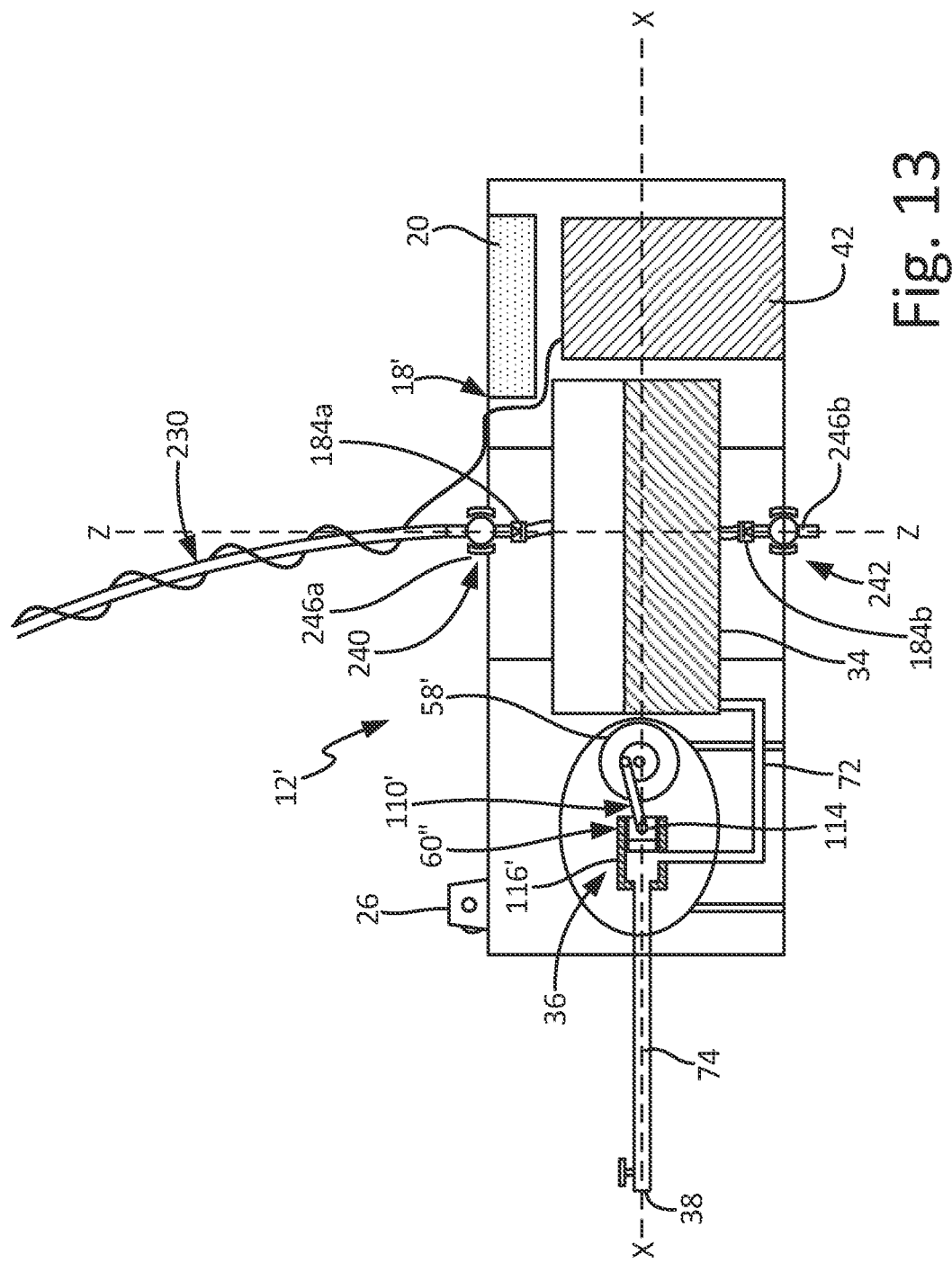
FIG. 13 is a schematic perspective view of a UAV painting system.

FIG. 13 is a cross-sectional view of UAV 12. Body 18', control unit 20, sensors 26, reservoir 34', sprayer 36', nozzle 38, power source 42, supply tube 72, spray tube 74, upper fluid port 240, and lower fluid port 242 of UAV 12 are shown. Sprayer 36' includes sprayer motor 58', pump 60", and drive 110'. Pump 60" includes piston 114' and cylinder 116'. Upper fluid port 240 includes swivel joint 246a and valve 184a', and lower fluid port 242 includes swivel joint 246b and valve 184b'. Tether 230 includes supply hose 248 and electrical cable 250.

Reservoir 34' is disposed within body 18' and is configured to store a supply of fluid for application to a surface. Reservoir 34' can be integral with and formed from body 18' or can be inserted into body 18'. Sprayer 36' is disposed within body 18'. Sprayer motor 58' is connected to pump 60'' by drive 110'. Piston 114 extends into cylinder 116 and is configured to reciprocate within cylinder 116. Supply tube 72 extends between reservoir 34' and pump 60'' and provides a flowpath for fluid to flow to pump 60'' from reservoir 34'. Spray tube 74 extends from pump 60'' to nozzle 38. Nozzle 38 is disposed at the distal end of spray tube 74 opposite pump 60'', and nozzle 38 generates an atomized spray fan for application of the fluid to a surface. Nozzle 38 is aligned on longitudinal axis X-X extending through the center of gravity of UAV 12. Aligning nozzle 38 on longitudinal axis X-X prevents nozzle 38 from generating an undesired moment due to the force generated during spraying. Sensor 26 is disposed on UAV 12 and is configured to provide information regarding the one or more of the location, acceleration, and orientation of UAV 12. For example, sensor 26 can include a location sensor, such as location sensor 50 (FIG. 1), an inertial sensor, such as inertial sensor 52 (FIG. 1), and/or an optical sensor, such as optical sensor 48 (FIG. 1).

Upper fluid port 240 extends through a top of body 18' of UAV 12 and into reservoir 34'. In some examples, upper fluid port 240 extends through a lid of reservoir 34'. Valve 184a' is disposed downstream of or within upper fluid port 240 and is configured to allow fluid to flow into reservoir 34' through upper fluid port 240 and to prevent fluid from flowing out of reservoir 34' through upper fluid port 240. Similarly, lower fluid port 242 extends through a bottom of body 18' of UAV 12 and into reservoir 34'. Valve 184b' is disposed downstream of or within lower fluid port 242 and is configured to allow fluid to flow into reservoir 34' through lower fluid port 242 and to prevent fluid from flowing out of reservoir 34' through lower fluid port 242. Upper fluid port 240, lower fluid port 242, and reservoir 34' are aligned on a vertical axis Z-Z, which extends through the center of gravity of UAV 12. Aligning upper fluid port 240, lower fluid port 242, and reservoir 34' on vertical axis Z-Z ensures that the center of gravity remains in the same location regardless of the level of fluid within reservoir 34'. In some examples, reservoir 34' is eliminated from UAV 12, and upper fluid port 240 and lower fluid port 242 are directly connected to sprayer 36' via supply tube 72. For example, a single supply tube can extend from pump 60'' and can branch into two branches, with the first branch extending to upper fluid port 240 and the second branch extending to lower fluid port 242.

Swivel joints 246a and 246b are attached to body 18' and configured to connect to tether 230. Swivel joint 246a allows upper fluid port 240 to point in multiple directions along multiple axes and to rotate, preventing entanglement with tether 230. Swivel joint 246b similarly allows lower fluid port 242 to point in multiple directions along multiple axes and to rotate, preventing tether 230 from becoming tangled. Swivel joints 246a and 246b are any suitable rotatable joint that can connect to tether 230 while allowing UAV 12 to move about vertical axis Z-Z relative to tether 230. For example, swivel joints 246a and 246b can be ball swivel connectors with the socket portions formed from or attached to body 18'. Swivel joints 246a and 246b can also each include two hydraulic swivel joints, each rotating about a 90 degree bend and about a different axis.

Tether 230 extends to UAV 12 and is attached at upper fluid port 240. Supply hose 248 is connected to upper fluid port 240 to provide fluid to reservoir 34'. It is understood, however, that tether 230 can be attached to lower fluid port 242 to supply fluid through lower fluid port 242. As such, UAV 12 can receive fluid through either upper fluid port 240 or lower fluid port 242. Power source 42 is disposed within body 18' and configured to provide power to electronics on UAV 12. In some examples, power source 42 is a battery, such as a lithium ion rechargeable battery. In other examples, power source 42 is connected to electrical cable 250 to receive power from an off-board source, such as an outlet or generator. Control unit 20 is disposed on body 18' and is configured to implement functions and execute commands. Control unit 20 can receive power from a battery and/or electrical cable 250. In some examples, electrical cable 250 can be a communications cable to provide a wired communications link between control unit 20 and an off-board controller, such as off-board control unit 64 (FIGS. 11-12) or user interface (best seen in FIG. 1).

During operation, fluid is supplied to UAV 12 through supply hose 248 and upper fluid port 240. Control unit 20 can communicate with off-board components, such as off-board components 14 (FIG. 1), off-board components 14' (FIG. 11), and off-board components 14'' (FIG. 12), to regulate the flow of fluid to UAV 12. In the example shown, the fluid enters UAV 12 through upper fluid port 240, but the fluid can enter UAV 12 through lower fluid port 242 where tether 230 is connected to lower fluid port 242. In some examples, UAV 12 does not include reservoir 34'; instead, upper fluid port 240 and lower fluid port 242 can be directly connected to supply tube 72 to provide fluid directly to sprayer 36' Eliminating reservoir 34' decreases the load carried by UAV 12 and eliminates any imbalance that can occur due to shifting fluid in reservoir 34'.

Sprayer motor 58' rotates and powers drive 110'. Drive 110' converts the rotational motion of sprayer motor 58' into linear, reciprocal motion of piston 114'. Piston 114' draws fluid into cylinder 116' during a suction stroke and pressurizes and drives the fluid downstream to nozzle 38 during a pumping stroke. Nozzle 38 atomizes the fluid and generates a spray fan for application to a surface.

UAV 12 provides significant advantages. Including upper fluid port 240 and lower fluid port 242 allows UAV 12 to receive fluid from a remote source located either above or below UAV 12. As such, UAV 12 allows the user to utilize multiple spraying systems with a single UAV 12. In examples that eliminate reservoir 34', the weight of UAV 12 is reduced, thereby decreasing the load and size of UAV 12. Swivel joints 246a and 246b provide UAV 12 with a full range of motion even where UAV 12 is attached to tether 230.

Figure 14A:
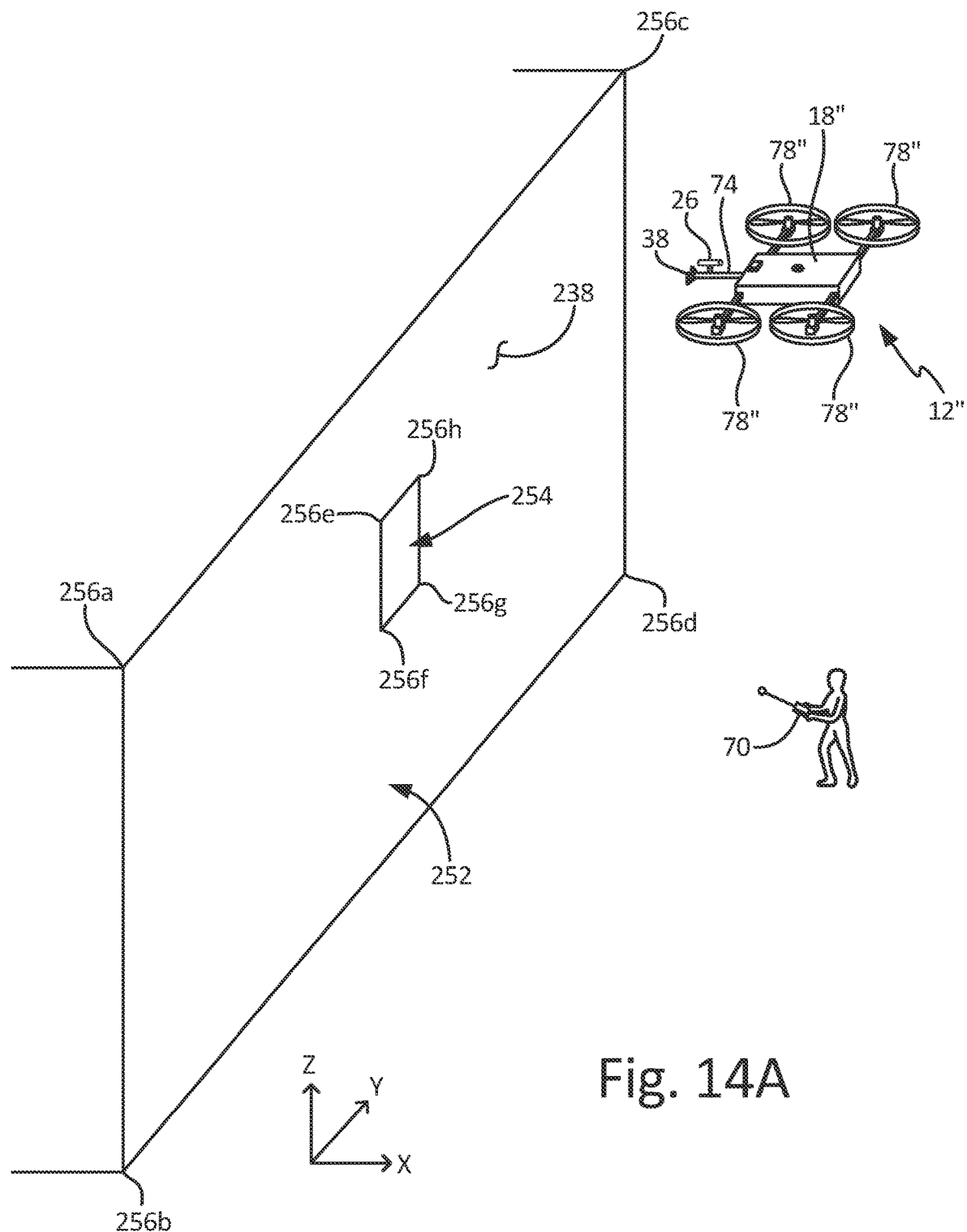
FIG. 14A is a simplified schematic diagram of an automated surface profiling and painting system.
Figure 14B:
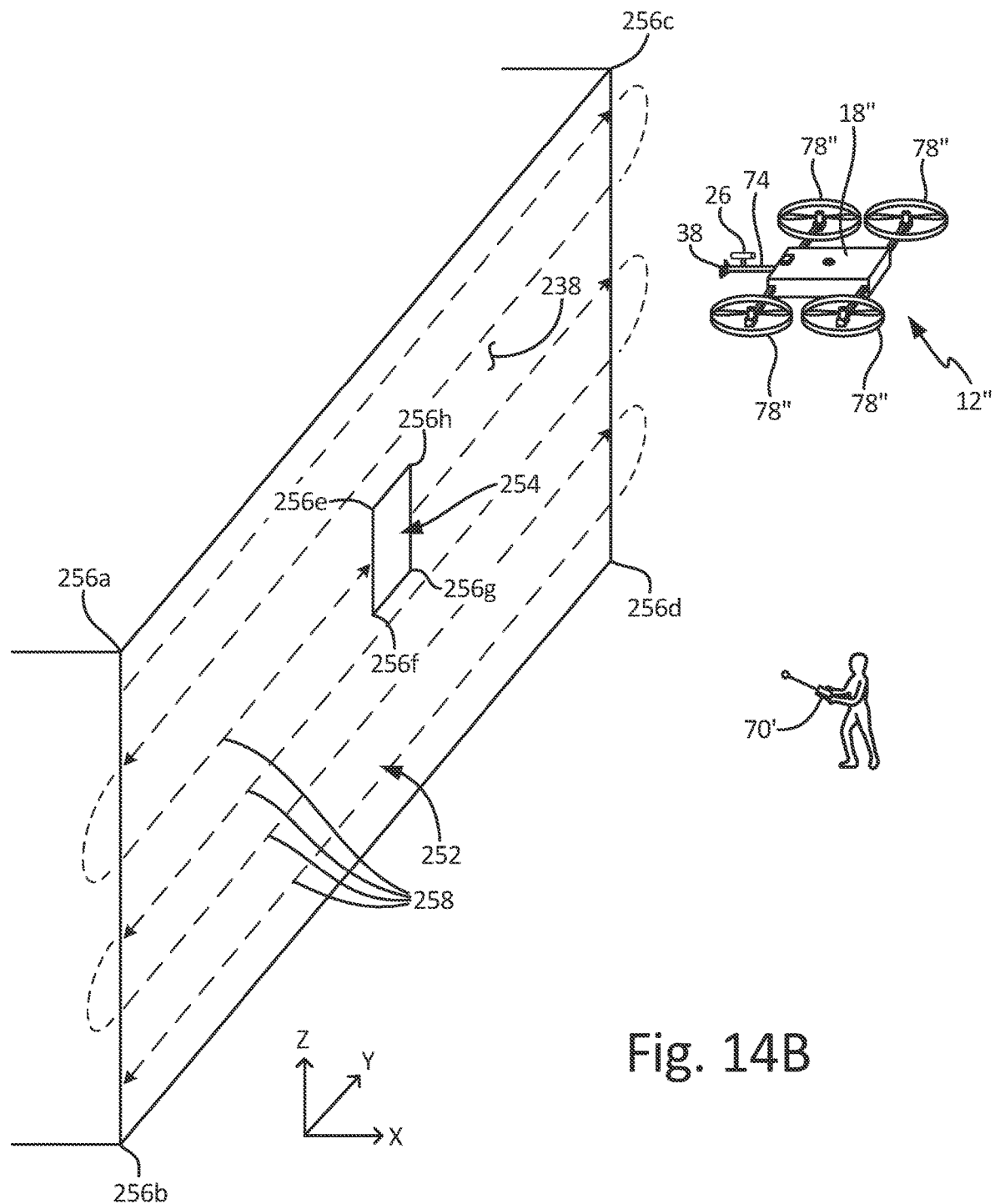
FIG. 14B is a simplified schematic diagram of an automated surface profiling and painting system.

FIG. 14A is a simplified schematic diagram of automated surface profiling and spray system 10. FIG. 14B is a simplified schematic diagram illustrating a flight plan for use in automated surface profiling and spray system 10. FIGS. 14A and 14B will be discussed together. Automated surface profiling and spray system 10 includes UAV 12, surface 238, and user interface 70. UAV body 18'', lift rotors 78, spray tube 74, nozzle 38, and sensors 26 of UAV 12 are shown. UAV 12 is simplified, but it is understood that UAV 12 can include any of the components described herein. Surface 238 includes spray area 252 and non-spray area 254.

Surface 238 is a surface to be sprayed with fluid by UAV 12. Spray area 252 is the area of surface 238 onto which the fluid is to be applied, such as a wall, for example. Non-spray area 254 is an area of surface 238 onto which no fluid is to be applied, such as a window, for example. UAV body 18" supports various components of UAV 12. Lift rotors 78 extend from UAV body 18" and provide lift to UAV 12 during flight. Spray tube 74 extends from UAV body 18" and is configured to provide fluid to nozzle 38 from UAV 12. Nozzle 38 is attached to spray tube 74 and configured to atomize the fluid and generate a fluid spray fan. Sensors 26 are mounted on spray tube 74 proximate nozzle 38, such that information gathered by sensors 26 represents an approximate location of nozzle 38. In some examples, sensors 26 can be mounted to nozzle 38. Sensors 26 can be any suitable sensors for providing information regarding the location of nozzle 38, such as a GPS receiver chip, a camera, and a laser range finder, among others. For example, sensors 26 can include a location sensor, such as location sensor 50 (FIG. 1), and an optical sensor, such as optical sensor 48 (FIG. 1).

Boundary points 256 define spray area 252 and non-spray area 254. Boundary points 256 are marked at locations defining spray area 252 and non-spray area 254. To define boundary points 256, the user controls the flight of the UAV 12 via user interface 70. The user flies UAV 12 to position sensors package at boundary points 256. In some examples, sensors 26 include a camera that transmits real time video to user interface 70 to provide a first person perspective view to the user to assist in flying UAV 12. When sensors 26 are located at a boundary point 256, the user can digitally mark the location via user interface 70. The location of each boundary point 256 can be saved in a memory, such as a memory of control unit 20 (best seen in FIG. 1), or a memory of an off-board controller, such as off-board controller (FIGS. 11-12). In some examples, the off-board controller and the memory can be disposed in user interface 70 to allow the user to quickly recall and view information. For example, where sensors 26 include a GPS receiver chip, the GPS coordinates can be recorded when the user marks the location.

In some examples, two types of boundary points can be marked: inclusion points, such as boundary points 256a-256d, and exclusion points, such as boundary points 256e-256h. The user marks the corners or other boundaries spray area 252 with inclusion points 256a-256d. The user then marks the corners or other boundaries of the non-spray area 254, which is within the plane of the spray area 252, with exclusion points 256e-256h. For example, the user can fly UAV 12 to the corners of surface 238, marking each as an inclusion points 256a-256d. The user flies UAV 12 to the corners of non-spray area 254, marking each as an exclusion points 256e-256h. Based on the inclusion and exclusion points, control circuitry, such as control unit 20, can interpolate from the inclusion points and digitally define the surface to be sprayed, spray area 252, while excluding portions not to be sprayed, non-spray area 254, based on the exclusion points. For example, the program can define a bounded plane based on all of the inclusion points being at the corners of the bounded plane. Exclusion planes can similarly be defined from exclusion points and then deleted from the bounded plane.

In some examples, boundary points 256 are marked when sensors 26 indicate that UAV 12 is a desired spray distance from surface 238. As such, the control circuitry of UAV 12 recognizes that UAV 12 is at a desired spray distance when sensors 26 indicate that UAV 12 is at the same distance from surface 238 as when boundary points 256 were marked.

In some examples, sensors 26 can mark boundary points 256 by being aligned along the plane parallel with the plane of surface 238. For example, sensors 26 can include a range finder to determine the distance to surface 238. For example, sensors 26 can include a proximity sensor, radar transducer, ultrasonic and/or acoustic rangefinder, laser rangefinder, magnetometer, radar, and lidar, among other options. The distance to surface 238 can be used by the control circuitry to calculate the coordinates of each boundary point 256. For example, the control circuitry can take into account the GPS location of sensors 26 and the distance to surface indicated by sensors 26 to locate boundary points 256 on surface 238. In other examples, the user uses a camera to tag the location with the range finder. In another example, the user holds and points a laser at surface 238 to identify each inclusion point 256a-256d, and sensors 26 include an optical laser sensor for locating the point indicated by the user. UAV 12 then flies to or near each laser designated spot to digitally mark the spot as an inclusion point 256a-256d. Exclusion points 256e-256h can be marked in a similar fashion.

With boundary points 256 assigned, a spray plan is automatically generated by the control unit. For example, the control unit can assign raster lines 258 (e.g., horizontal or vertical lines) over surface 238. Each raster line 258 corresponds to one pass of spraying by UAV 12. In some examples, the height of each raster line 258 corresponds to a standard height or width of the spray fan. Each raster line 258 is set so that each part of spray surface 238 is covered by a raster line. Raster lines 258 are assigned GPS coordinates, the control unit generates a flight plan including pathways along raster lines 258, and the control unit further defines spray "on" and spray "off" times during which the fluid is sprayed or not sprayed from nozzle 38. For example, the control unit defines spray "on" as when UAV 12 is located within the boundary defined by inclusion points 256a-256d but outside of the boundary defined by exclusion points 256e-256h. Similarly, the control unit defines spray "off" as when UAV 12 is located within the boundary defined by exclusion points 256e-256h or outside of the boundary defined by inclusion points 256a-256d.

In some examples, raster lines 258 can be spaced such that spray overlap, such as a 50% overlap, occurs with each pass of UAV 12. As such, each point on spray surface 238 receives a double coat of the fluid. In some examples, raster lines 258 are fit end-to-end such that there is no spray overlap. UAV 12 sprays the fluid on spray surface 238 following the GPS coordinate pathways and spraying or not spraying per the flight plan. When UAV 12 reaches the end of each raster line 258, UAV 12 shifts vertically to the next raster line 258 and reverses course along surface 238 to apply a new stripe of fluid. UAV 12 sprays spray surface 238 and automatically stops spraying as UAV 12 passes over non-spray surface 238. While the flight/spray plan is described as including horizontal raster lines 258, it is understood that the flight/spray plan can also generate and cause UAV 12 to follow vertical raster lines.

Although the present invention has been described with reference to preferred embodiments, workers skilled in the art will recognize that changes may be made in form and detail without departing from the spirit and scope of the invention.

The invention claimed is:

1. An unmanned aerial vehicle (UAV) for spraying a fluid on a surface of a structure, the UAV comprising:
   a UAV body supporting at least one lift rotor configured to operationally drive the UAV body;
   a spray tube extending from the UAV body;
   a nozzle supported by the UAV body via the spray tube, the nozzle including a single orifice that is configured to release the fluid along a spray axis as a spray on the surface, wherein the single orifice is shaped to atomize the spray fluid into a spray fan, wherein the nozzle is rotatable relative to the UAV body to change an orientation of the single orifice and thereby change an orientation of the spray fan emitted from the nozzle relative to the UAV body, and wherein the single orifice is disposed in-line with the spray tube;

a sleeve connecting the nozzle to the spray tube and extending axially between the spray tube and the nozzle;

a first arm extending from the UAV body and supporting a first lift rotor;

a second arm extending from the UAV body and supporting a second lift rotor; and a control unit supported by the UAV body, wherein the control unit is configured to control operation of the first lift rotor and the second lift rotor during flight of the UAV and the control unit is configured to control release of the fluid from the nozzle;

wherein the orientation of the nozzle is configured to change relative to the UAV body in flight such that the sleeve and the nozzle are reoriented relative to the UAV body to change the orientation of the spray fan and such that the nozzle is reoriented relative to the first lift rotor and the second lift rotor during rotation of the first lift rotor and the second lift rotor; and wherein the orientation of the nozzle is configured to change such that a spray fan generated by the nozzle is oriented orthogonal to a direction of travel of the UAV.

2. The UAV of claim 1, further comprising a fluid source supported by the UAV body.

3. The UAV of claim 1, wherein the nozzle is supported on a spray tube extending from the UAV body.

4. The UAV of claim 1, wherein the nozzle is rotatable from a first position in which the nozzle is oriented to generate a horizontal spray fan.

5. The UAV of claim 4, wherein the nozzle is rotatable to a second position in which the nozzle is oriented to generate a vertical spray fan.

6. The UAV of claim 1, wherein the nozzle comprises:
a tip bore;
a rotatable tip extending into the tip bore; and
an orifice disposed within the rotatable tip, the orifice including a first end and a second end, wherein the first end is configured to generate the spray fan.

7. The UAV of claim 1, further comprising:
a fan rotating assembly operatively connected to the nozzle to rotate the nozzle relative to the UAV body.

8. The UAV of claim 7, wherein the fan rotating assembly comprises:
a sleeve mounted on a spray tube, the sleeve rotatable relative to the spray tube; and
a rotation mechanism interfacing with the sleeve and configured to rotate the sleeve relative to the spray tube.

9. The UAV of claim 8, wherein the rotation mechanism includes a rotation motor supported by the UAV body.

10. The UAV of claim 9, wherein:
the sleeve includes a plurality of teeth extending at least partially around a circumference of the sleeve; and
the rotation mechanism includes a rotation pinion extending from the rotation motor, the rotation pinion engaging at least one of the plurality of teeth.

11. The UAV of claim 10, wherein the plurality of teeth extend at least 90-degrees around the circumference of the sleeve.

12. The UAV of claim 1, wherein the first lift rotor is disposed at a first distal end of the first arm extending from the UAV body, and wherein the second lift rotor is disposed at a second distal end of the second arm extending from the UAV body.

13. The UAV of claim 1, wherein the control unit is configured to maintain the UAV orientation throughout a spray pass, such that a difference between a first distance between a first distance sensor and the surface and a second distance between a second distance sensor and the surface remains steady throughout the spray pass.

14. The UAV of claim 1, wherein the control unit is configured to move the nozzle along vertical spray passes relative to the surface.

15. The UAV of claim 1, further comprising:
a spray tube supporting the nozzle; and
a valve controller supported by the spray tube, the valve controller configured to control movement of a spray valve disposed upstream of the nozzle and configured to control flow of the fluid to the nozzle;
wherein the control unit is configured to control operation of the valve controller to control spraying by the nozzle.

16. The UAV of claim 1, further comprising:
a sprayer pump supported by the UAV body and configured to drive the fluid to the nozzle for spraying.

17. A method comprising:
emitting a spray fan of spray fluid from a single orifice of a nozzle supported by a UAV body of a UAV by a spray tube extending from the UAV body, the UAV body supporting at least one lift rotor configured to operationally drive the UAV body, the spray fan being in a first orientation, the single orifice shaped to atomize the spray fluid into the spray fan;
rotating the nozzle relative to the UAV body while in flight during rotation of the at least one lift rotor to change an orientation of the single orifice while in flight and relative to the UAV body such that the single orifice is reoriented to emit the spray fan in a second orientation different from the first orientation, the second orientation orthogonal to a direction of travel of the UAV, the nozzle and the single orifice in-line with the spray tube with the spray fan in the first orientation and the second orientation; and
emitting the spray fan of spray fluid from the nozzle with the spray fan in the second orientation.

* * * * *